United States Patent
Fujita et al.

(10) Patent No.: US 8,462,387 B2
(45) Date of Patent: Jun. 11, 2013

(54) IMAGE PROCESSING DEVICE, PRINTING APPARATUS, AND IMAGE PROCESSING METHOD

(75) Inventors: Shigeru Fujita, Yokohama (JP); Akira Ichimura, Tokyo (JP); Yasunori Fujimoto, Inagi (JP); Shinichi Miyazaki, Kawasaki (JP); Hironori Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 12/651,697

(22) Filed: Jan. 4, 2010

(65) Prior Publication Data
US 2010/0171972 A1 Jul. 8, 2010

(30) Foreign Application Priority Data
Jan. 7, 2009 (JP) .................... 2009-001634

(51) Int. Cl.
*G06F 15/00* (2006.01)
(52) U.S. Cl.
USPC .............................. 358/1.9; 358/1.8; 358/1.14
(58) Field of Classification Search
USPC .......................................... 358/1.9, 1.8, 1.14
See application file for complete search history.

(56) References Cited

U.S. PATENT DOCUMENTS

| | | | |
|---|---|---|---|
| 5,818,474 A | 10/1998 | Takahashi et al. | |
| 6,042,212 A | 3/2000 | Takahashi et al. | |
| 6,491,372 B1 | 12/2002 | Shioya et al. | |
| 6,511,143 B1 | 1/2003 | Ishikawa et al. | |
| 6,511,146 B2 | 1/2003 | Ishikawa et al. | |
| 6,779,872 B2 | 8/2004 | Shioya et al. | |
| 6,834,927 B2 | 12/2004 | Yashima et al. | |
| 7,198,345 B2 | 4/2007 | Shibata et al. | |
| 7,614,713 B2 | 11/2009 | Marumoto | |
| 7,812,859 B2 * | 10/2010 | Ito et al. ..................... | 348/207.1 |

(Continued)

FOREIGN PATENT DOCUMENTS

| | | |
|---|---|---|
| CN | 101301813 A | 11/2008 |
| JP | 6-191041 | 7/1994 |

(Continued)

OTHER PUBLICATIONS

Office Action dated Aug. 23, 2012, in Chinese Application No. 201010000274.2.

(Continued)

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

Multi-valued image data stored in an input image buffer are read out for each time of scans, and the color space conversion and image distribution are performed to read multi-valued image data. The binarized result is sent to the print buffer and at the same time, is accumulated as the print information to execute processing of reflecting it to the image distribution processing of the next pass. It is possible to appropriately restrict the density fluctuation due to the print position shift between planes without providing pixels where dots are overlapped and printed more than necessary. With this, by accumulating the multi-valued image data at the stage of RGB in the input image buffer to read out data stored in input image buffer for executing processing, a capacity required for input image buffer does not change even if the number of the ink colors provided on the printing apparatus increases.

6 Claims, 16 Drawing Sheets

U.S. PATENT DOCUMENTS

| | | |
|---|---|---|
| 8,052,242 B2 | 11/2011 | Uchiyama et al. |
| 8,274,704 B2 | 9/2012 | Fujimoto et al. |
| 2005/0246684 A1* | 11/2005 | Shiraishi ................ 717/115 |
| 2008/0137146 A1 | 6/2008 | Marumoto |
| 2008/0316509 A1* | 12/2008 | Kuwahara ................ 358/1.8 |
| 2009/0002766 A1 | 1/2009 | Horii et al. |
| 2009/0168087 A1 | 7/2009 | Fujimoto et al. |
| 2009/0244572 A1 | 10/2009 | Hansaki et al. |
| 2010/0165390 A1 | 7/2010 | Nakamura et al. |
| 2010/0188678 A1 | 7/2010 | Miyazaki et al. |

FOREIGN PATENT DOCUMENTS

| | | |
|---|---|---|
| JP | 7-52390 | 2/1995 |
| JP | 2000-103088 | 4/2000 |
| JP | 2001-150700 A | 6/2001 |
| JP | 2004-242213 A | 8/2004 |
| JP | 2006-44258 A | 2/2006 |
| JP | 2006-231736 | 9/2006 |
| JP | 2008-265354 A | 11/2008 |
| JP | 2008-307870 A | 12/2008 |
| JP | 2009-154391 A | 7/2009 |
| JP | 2009-166477 A | 7/2009 |
| JP | 2009-246730 A | 10/2009 |
| JP | 2010-149385 A | 7/2010 |

OTHER PUBLICATIONS

Notification of Reasons for Refusal dated Feb. 5, 2013, in Japanese Application No. 2009-001634.

* cited by examiner

| 1/16 | 2/16 | 1/16 |
|------|------|------|
| 2/16 | 4/16 | 2/16 |
| 1/16 | 2/16 | 1/16 |

FIG.9A

| 16 | 32 | 16 |
|----|----|----|
| 32 | 64 | 32 |
| 16 | 32 | 16 |

FIG.9B

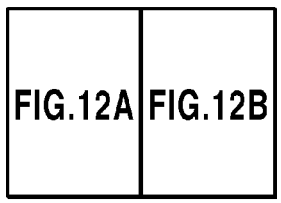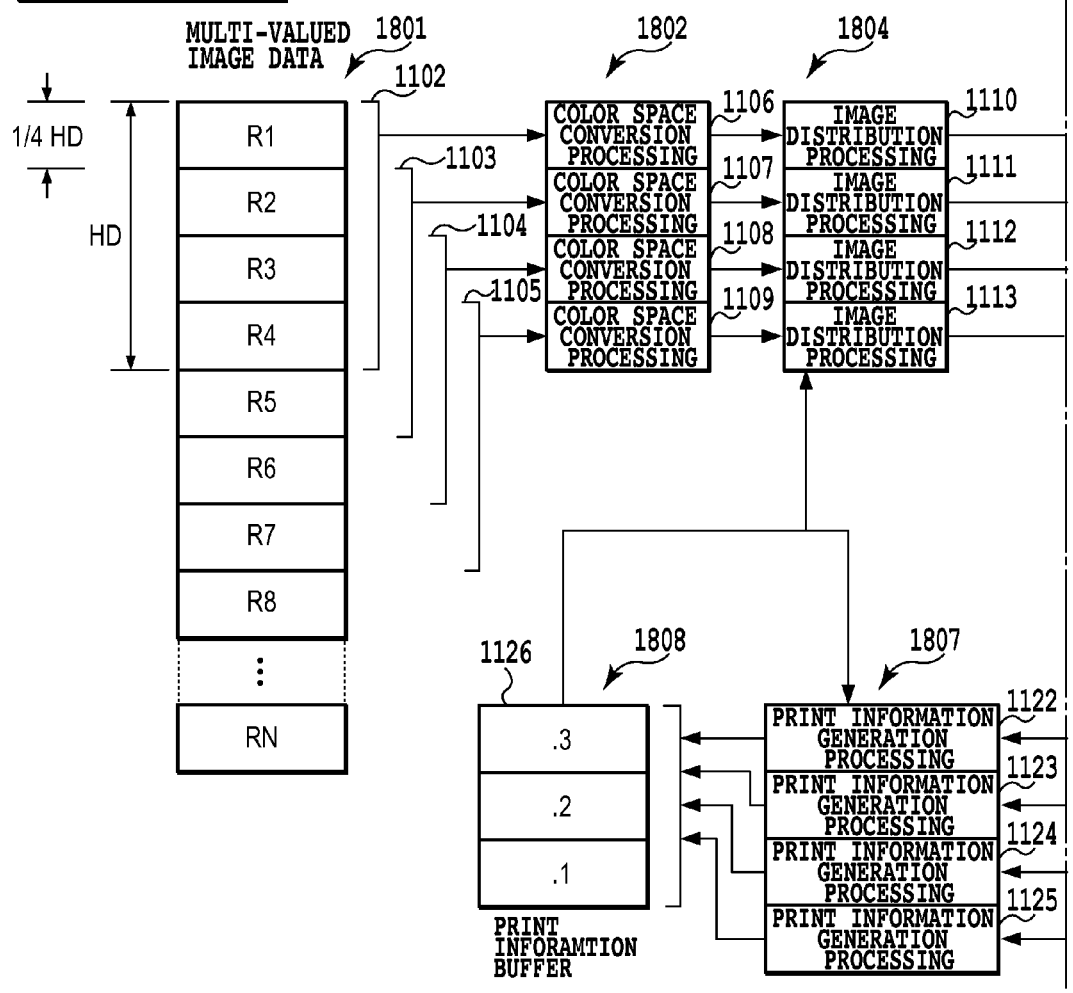

IMAGE PROCESSING DEVICE, PRINTING APPARATUS, AND IMAGE PROCESSING METHOD

BACKGROUND OF THE INVENTION

1. Field of the Invention

The present invention relates to an image processing apparatus, a printing apparatus, and an image processing method, and particularly, to a print data generating configuration that enables an image print to have a tolerance for image quality degradation against variations of print characteristics between printing elements of a print head, a fluctuation in scanning of the print head, a conveying error of a print medium and the like.

2. Description of the Related Art

As an example of a printing system using a print head provided with a plurality of printing elements, there is known an inkjet print system which ejects ink from an ejection opening as the printing element to form dots on a print medium. Such an inkjet printing apparatus is classified into a full line type and a serial type depending particularly on a difference in construction of the print head.

The full line type printing apparatus is provided with the print head which includes printing elements arranged over a range corresponding to a width of the print medium conveyed and is used in a fixed state at printing. The print medium is conveyed in a direction, which intersects the array direction of the printing elements, relative to the print head used in the fixed state and ink is ejected to the print medium in a predetermined frequency from the print head to form an image. Such a full line type printing apparatus can form the image at a relatively high speed and is suitable for office use. On the other hand, in the serial type printing apparatus, a print head scans a print medium, ink is ejected thereon at a predetermined frequency during the scanning, and a conveying operation conveying the print medium in a direction intersecting with the scanning direction of the print head is performed for each scan to form an image. Such a serial type printing apparatus can be manufactured in a relatively small size and at low costs and is suitable for personal use.

In any of these full line type and serial type printing apparatuses, a plurality of printing elements arranged in the print head contain a certain degree of variations in the manufacturing process. These variations appear as variations of ejection characteristics such as an ejection amount or an ejection direction of ink to produce irregular shapes of dots formed on the print medium, as a result possibly creating uneven density or stripes on an image.

For overcoming this problem, a so-called multi-pass printing system is employed in the serial type inkjet printing apparatus, for example. In the multi-pass printing, pixels to which the print head can perform printing in one-time printing main scan are distributed to a plurality of scans of the print head between which a conveying operation of the print medium is performed so as to make different printing elements used in the plurality of scans for performing the printing operation. This allows the variations in ejection characteristics in the plurality of the printing elements to be dispersed into the plurality of scans for completing the image, enabling the uneven density to be indistinctive. This multi-pass print system can be also applied to the full line type printing apparatus.

As shown in FIG. 1, two lines of printing elements in regard to ink of the same color are arranged in a conveying direction of the print medium, thereby enabling the dot line formed in the conveying direction to be shared and printed by the two printing element lines. As a result, the variation of the printing elements in one printing element line is dispersed into ½, enabling the uneven density due to the variation to be indistinctive.

In a case of performing the multi-pass printing, print data of the image are distributed into plural times of printing scans or a plurality of print heads (printing element lines) for completing the image. Conventionally most of the times this distribution is carried out by using a mask pattern in which a pixel ("1") permitting printing a dot and a pixel ("0") not permitting printing a dot are in advance defined corresponding to an individual printing element.

FIG. 2 is a diagram showing an example of a mask pattern used in a multi-pass print for completing a printing by two times of scans (hereinafter, also called "pass") in the serial system. In FIG. 2, black areas each show a pixel ("1") permitting printing of a dot and white areas each show a pixel ("0") not permitting printing of a dot, and number 501 denotes a mask pattern used in a scan of first pass and number 502 denotes a mask pattern used in a scan of second pass. The pattern 501 and the pattern 502 are complementary with each other in regard to print permitting pixels (or print non-permitting pixels), and therefore, dots constituting an image to be completed are formed in any one of the first pass and second pass. Specifically, in regard to print data of the image to be completed, a logical product is carried out for each pixel between image data to be completed and the above patterns and thus the result becomes binary data according to which respective printing elements actually executes printing in each pass.

However, an arrangement of the print data ("1") in the pixels according to which printing is performed varies depending on the image to be printed. Therefore, it is difficult to always evenly distribute such a print data to the plurality of scans or plurality of printing element lines by using a mask pattern in which a pattern of the print permitting pixels is previously defined. Thus, a particular scan or a particular printing element line may print a high ratio of dots, and as a result, the ejection characteristic of the particular scan or of the particular printing element line appears in the image to decrease the original advantage of the multi-pass printing. Accordingly, in the multi-pass printing, how equally and evenly the print data are distributed into the plural scans or the plural printing element lines is one of important issues.

For example, Japanese Patent Laid-Open No. H07-052390 (1995) describes a method of producing a mask pattern in which print permitting pixels and print non-permitting pixels are arranged at a random. By using this random mask pattern, the print data can be expected to be distributed substantially equally to the plural scans and the plural printing element lines even in the print data of any image.

In addition, Japanese Patent Laid-Open No. H06-191041 (1994) describes a method in which the fixed mask pattern as shown in FIG. 2 is not used, but print data ("1") of plural pixels to be printed continuously in a main scan direction or in a sub scan direction are distributed to be printed in different scans as many as possible.

FIG. 3 is diagrams showing an arrangement of print pixels of binary image data and the result in which the print pixels are distributed to two scans according to the method described in Japanese Patent Laid-Open No. H06-191041 (1994). In this way, the dots continuous in a main scan direction and in a sub scan direction are distributed equally to different scans. Thereby, not only image degradation due to variations in ejection characteristics of the printing element, but also defects such as ink overflow can be effectively reduced.

Even if the above multi-pass system is employed, under recent situations where a higher-quality printing is demanded, a density change or an uneven density due to a shift of a print position (registration) in a scan unit or in a nozzle line unit is seen newly as a problem. The shift of the print position in the scan unit or in the nozzle line unit is caused by fluctuations in distance between the print medium and the ejection opening surface (distance from a sheet), fluctuations of a conveying amount of the print medium or the like, and appears as a shift between planes of image printed in respective scans (or by respective nozzle lines).

For example, there will be considered a case where in an example shown in FIG. 3, a plane of dots (one circle) printed in the precedent scan and a plane of dots (double circle) printed in the subsequent scan are shifted by an amount corresponding to one pixel from each other in any one of a main scan direction and a sub scan direction. In this case, the dots (one circle) printed in the precedent scan and the dots (double circle) printed in the subsequent scan completely overlap to generate white areas on the print medium, and the white areas lower the density of image. Even in a case where the shift is not as large as one pixel, the fluctuations in the distance between the neighboring dots and the overlapped portion have a large impact on a coverage of dots to the white areas of the print medium, finally on the image density. Specifically, when the shift between the planes changes with the fluctuation in the distance between the print medium and the ejection opening surface (the distance from a sheet) or the fluctuation in the conveying amount of the print medium, the density of the uniform image also changes with these fluctuations, which results in being recognized as density unevenness.

Therefore, there is a demand for a method of producing print data in the multi-pass printing in which even if the print position shift occurs between the planes, the image quality is not remarkably deteriorated due to the position shift. In the present specification, regardless of fluctuations in any printing condition, a tolerance property that shows how hard to produce the density change or the uneven density due to the print position shift even if the print position shift between the planes occurs due to the fluctuation are called a "robustness".

Japanese Patent Laid-Open No. 2000-103088 describes a method of producing print data for enhancing the above robustness. More specifically, this producing method has paid attention on a fact that the fluctuation in the image density due to the print position shift is, as described in detail in FIG. 3, caused by that binary print data distributed to plural times of scans or plural nozzle lines are completely complementary with each other. For reducing the extent of the above complementarity, the distribution of the image data to the plural times of the scans or the plural nozzle lines is carried out in a state of multi-valued data before binarizing and the multi-valued data after distributed are independently binarized.

FIG. 4 is a block diagram showing a control configuration example for realizing data distribution described in Japanese Patent Laid-Open No. 2000-103088. This figure shows an example of distributing print data to two print heads (two nozzle lines). Multi-valued image data received from a host computer 2001 are subject to various kinds of image processing (2004 to 2006), and thereafter, a multi value SMS section 2007 generates data for a first print head and data for a second print head based on the data that has been subjected to the various kinds of image processing. Specially the same multi-valued image data to which the image processing has been executed are prepared as the data for the first print head and the data for the second print head. In a first data conversion section 2008 and a second data conversion section 2009, conversion processing is executed using respective distribution coefficients. For example, a distribution coefficient of 0.55 is used to the data for the first print head and a distribution coefficient of 0.45 is used to the data for the second print head to execute the conversion processing. In consequence, the content of binarization processing to be executed later can be made different between the data for the first print head and the data for the second print head. Then, as described later in FIG. 5, overlaps of dots by the first print head and dots by the second print head finally formed can be generated in a certain ratio. It should be noted that Japanese Patent Laid-Open NO. 2000-103088 describes, in addition to an example where the distribution coefficient varies between the data for the first print head and the data for the second print head, an example where an error diffusion matrix used in error diffusion processing as binarization processing or threshold values in the error diffusion matrix varies.

The multivalued data converted as above are transferred to a first binarization processing section 2010 and a second binarization processing section 2011. In the first binarization processing section 2010 and the second binarization processing section 2011, the binarization processing is executed by an error diffusion method using an error diffusion matrix and threshold values, and the binarized image data are stored respectively in a first band memory 2012 and in a second band memory 2013. Thereafter, the first and second print heads eject ink according to the binary data stored in the respective band memories to perform printing.

FIG. 5 is a diagram showing an arrangement of dots on the print medium which are printed according to the aforementioned processing described in Japanese Patent Laid-Open No. 2000-103088. In FIG. 5, a black circle 21 shows a dot printed by the first print head, a white circle 22 shows a dot printed by the second print head, a circle 23 shown in a hatched line shows a dot printed in an overlapped manner by the first print head and the second print head.

Here, a case will be considered where in the same way as the example shown in FIG. 3, a plane of dots printed in the first print head and a plane of dots printed in the second print head are shifted by an amount corresponding to one pixel from each other in any one of a main scan direction or a sub scan direction. In this case, dots printed in an overlapped manner by both the first print head and the second print head are newly increased, but there exist also dots where the dot composed of two dots which are already printed in the overlapped manner is separated. Accordingly, when the determination is made based upon an area having a certain breadth, the coverage of the dots to the white area does not change so much, therefore not inviting a change of the image density. That is, the overlap of the dots is generated in a certain rate while basically eliminating complementarity or exclusiveness of dot formation by different scans or different print heads. Thereby, even if a shift of a print position due to fluctuations in scan speed of the carriage, fluctuations in distance (distance from a sheet) between the print medium and the ejection opening surface, fluctuations in conveying amount of the print medium, and the like is generated, the degree of fluctuations in image density or the density unevenness due to the fluctuations can be reduced to be small.

Further, Japanese Patent Laid-Open No. 2006-231736 describes the print data generation similar to that in Japanese Patent Laid-Open No. 2000-103088. Specifically, in the same way as Japanese Patent Laid-Open No. 2000-103088, the distribution coefficients are made different between the plural scans or between the plural printing element lines at the time of distributing the multi-valued image data to the plural scans or the plural printing element lines. In Japanese Patent Laid-Open No. 2006-231736, the distribution coefficient varies in accordance with pixel positions. For example, the distribution coefficients of two print heads vary in a linear way, in a periodical way, in a sinusoidal wave way, and in a combined wave way of a high frequency and a low frequency to the pixel position in a main scan direction, thereby restricting banding or color unevenness in the multi-pass printing.

However, in the print data generation described in Japanese Patent Laid-Open No. 2000-103088 and Japanese Patent Laid-Open No. 2006-231736, complementarities or exclusiveness between dots printed by different print heads or between dots printed in different scans can not be basically controlled. Therefore, a ratio of pixels where dots overlap may be excessively large or inversely a ratio of blank areas where dots are not printed may be excessively large, depending on an image to be printed, thus possibly decreasing an image quality. That is, as described before, to restrict the density fluctuation due to the print position shift between the planes, a fact that respective dots printed in a plurality of scans have no complementary relation with each other, that is, a fact that there exist the pixel where the dots are printed in an overlapped manner in the plurality of scans is effective. On the other hand, when such pixels exist too many, the dot coverage may decrease and adversely decease in the density may be possibly caused.

SUMMARY OF THE INVENTION

The inventors of the present application have found out that, for solving the aforementioned problem, when quantizing data of a plurality of planes which are obtained by dividing multi-valued data, the result of quantizing for one plane is reflected as print information to data in the plane for which gradation lowering is performed after performing quantizing for the one plane. In consequence, given complementarity or exclusiveness can be brought between respective print data of the plurality of planes to allow a ratio of the pixels where the dots overlap to be appropriate.

An object of the present invention is to reduce a memory capacity and a processing amount in a case of employing the above-mentioned configuration that reflects the print information to quantization of the other plane.

More specifically, there has been recently commercialized in the market a so-called large-sized printer in which a print width of the printing apparatus is widened more largely, for example, a print width of 60 inches, as compared to that in the printing apparatus used in the conventional disc top. This type of large-sized printers cause a large increase in the memory capacity needed for executing the image processing due to a wide print width thereof. Further, in addition to four colors of CMYK, light color ink of coloring material having lower concentration than C, M inks such as light cyan and light magenta inks and ink of a color called particular color such as red and green tend to be used for improving a print quality, thus increasing the number of ink colors to be mounted on the printer. Such an increase in the ink color number is also the cause of largely increasing a memory capacity to be equipped on a printing apparatus. Further, also in the large-sized printer, a high-speed print processing performance is required and thus it is needed to mount a large capacity of the memory for improving the processing performance.

Mounting a large capacity of the memory in this way causes an increase in cost of the printing apparatus, and the processing amount is increased in response thereto. For reflecting the above print information to the other plane, the memory corresponding to the reflecting is required and therefore, it is preferable to reduce the memory capacity for the reflecting as much as possible.

The present invention is made in view of the foregoing problem and an object of the present invention is to provide an image processing apparatus, a printing apparatus and an image processing method which restrict an increase in a memory capacity in the configuration of bringing a complementary relation in the distribution of the multi-valued data.

In a first aspect of the present invention, there is provided an image processing apparatus comprising: a buffer configured to store first image data expressed by multi value; a read-out unit configured to read out the first image data stored in the buffer; a conversion unit configured to obtain a predetermined amount of the first image data read out by said read-out unit to perform a color space conversion so that the first image data is converted into second image data; a deriving unit configured to derive a part of the second image data obtained by the conversion of said conversion unit; a data generation unit configured to generate third image data having a lower gradation value than the second image data, based on the data derived by said deriving unit and print information; an information generation unit configured to generate the print information, based on the third image data generated by said data generation unit; and a control unit configured to control an area in said buffer from which the first image data is read out.

In a second aspect of the present invention, there is provided an image processing method comprising: a read-out step of reading out a first image data which is stored in a buffer and is expressed by multi value; a conversion step of obtaining a predetermined amount of the first image data read out by said read-out step to perform a color space conversion so that the first image data is converted into second image data; a deriving step of deriving a part of the second image data obtained by the conversion of said conversion step; a data generation step of generating third image data having a lower gradation value than the second image data, based on the data derived by said deriving step and print information; an information generation step of generating the print information, based on the third image data generated by said data generation step; and a control step of controlling an area in said buffer from which the first image data is read out.

According to the above configuration, the first multi-valued image data are read out from the image data storage means and are converted into the second multi-valued data. Then, the subsequent image data distribution and gradation lowering processing are carried out to the converted image data. Thereby, in a case of storing the data after the conversion, it is possible to prevent a storage capacity from increasing in accordance with the number of dimensions of a color space of the second multi-valued image data to be stored. As a result, in the configuration of bringing the complementarity in the distribution of the multi-valued data, it is possible to restrict an increase in the memory capacity.

Further features of the present invention will become apparent from the following description of exemplary embodiments (with reference to the attached drawings).

BRIEF DESCRIPTION OF THE DRAWINGS

FIGS. 9A and 9B are diagrams each showing a filter calculation made to binary print data from the gradation lowing section by the print information generation section shown in FIG. 8;

DESCRIPTION OF THE EMBODIMENTS

Hereinafter, embodiments of the present invention will be explained with reference to the drawings. The embodiment which will be explained hereinafter takes an ink jet printing apparatus as an example, but it is apparent from the following explanation that the present invention can be applied to a printing apparatus other than the ink jet printing apparatus as long as the printing apparatus prints an image in a dot alignment system using printing elements.

First Embodiment

Figure 6:
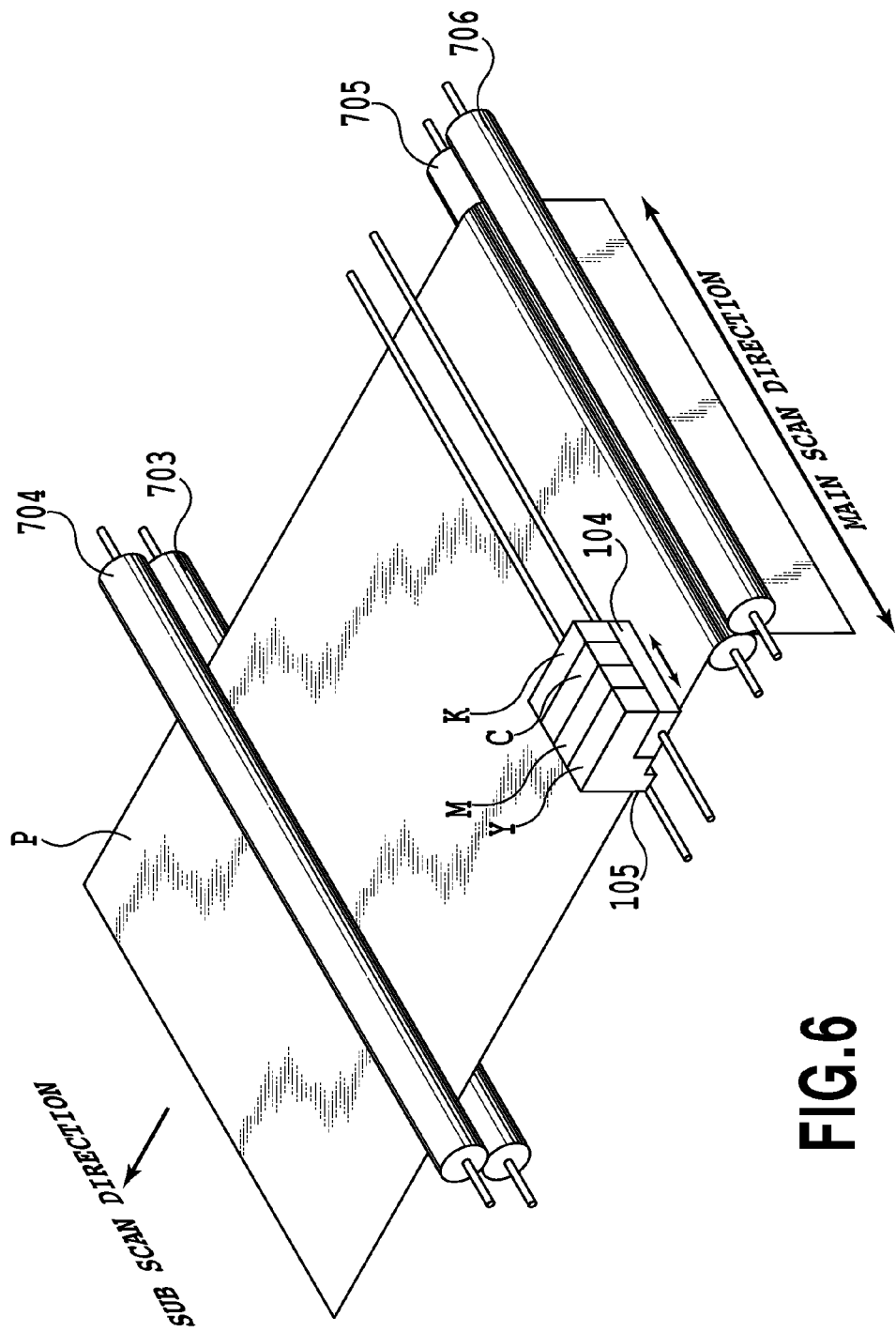
FIG. 6 is a perspective view explaining the schematic construction of a serial type inkjet printing apparatus according to a first embodiment of the present invention.

FIG. 6 is a perspective view explaining a schematic structure of a serial type inkjet printing apparatus according to a first embodiment of the present invention. A print head 105 is mounted on a carriage 104 that moves at a constant speed in a main scan direction and ejects ink according to print data in a frequency corresponding to the constant speed. When one time of scan is completed, a conveying roller 704 and an auxiliary roller 703 rotate and a print medium P held between these rollers and between a feeding roller 705 and an auxiliary roller 706 is conveyed in a sub scan direction by an amount corresponding to a print width by the print head 105. This scan and the conveying operation are intermittently repeated to print an image on the print medium P step by step.

The print head 105 includes print heads of black (K), cyan (C), magenta (M) and yellow (Y) which are located in a main scan direction shown in the figure and plurality of ejection openings are arranged in a sub scan direction in the print heads of the respective colors.

The printing apparatus according to the present embodiment can perform a so-called multi-pass printing which completes a print on an area of the print medium by performing a plural times of scans of the print head on the same area thereof. For example, in a case of completing a print for the area by twice scans (hereinafter, also called "pass"), twice scans are performed on the scan area of a width corresponding to an arrangement length of a single ejection opening line obtained by dividing a line of plural ejection openings arranged in the print head into two lines. In addition, the print medium is conveyed by a quantity equal to the above single arrangement length for a period between the two scans to associate the different ejection opening lines with the respective scans.

Figure 7:
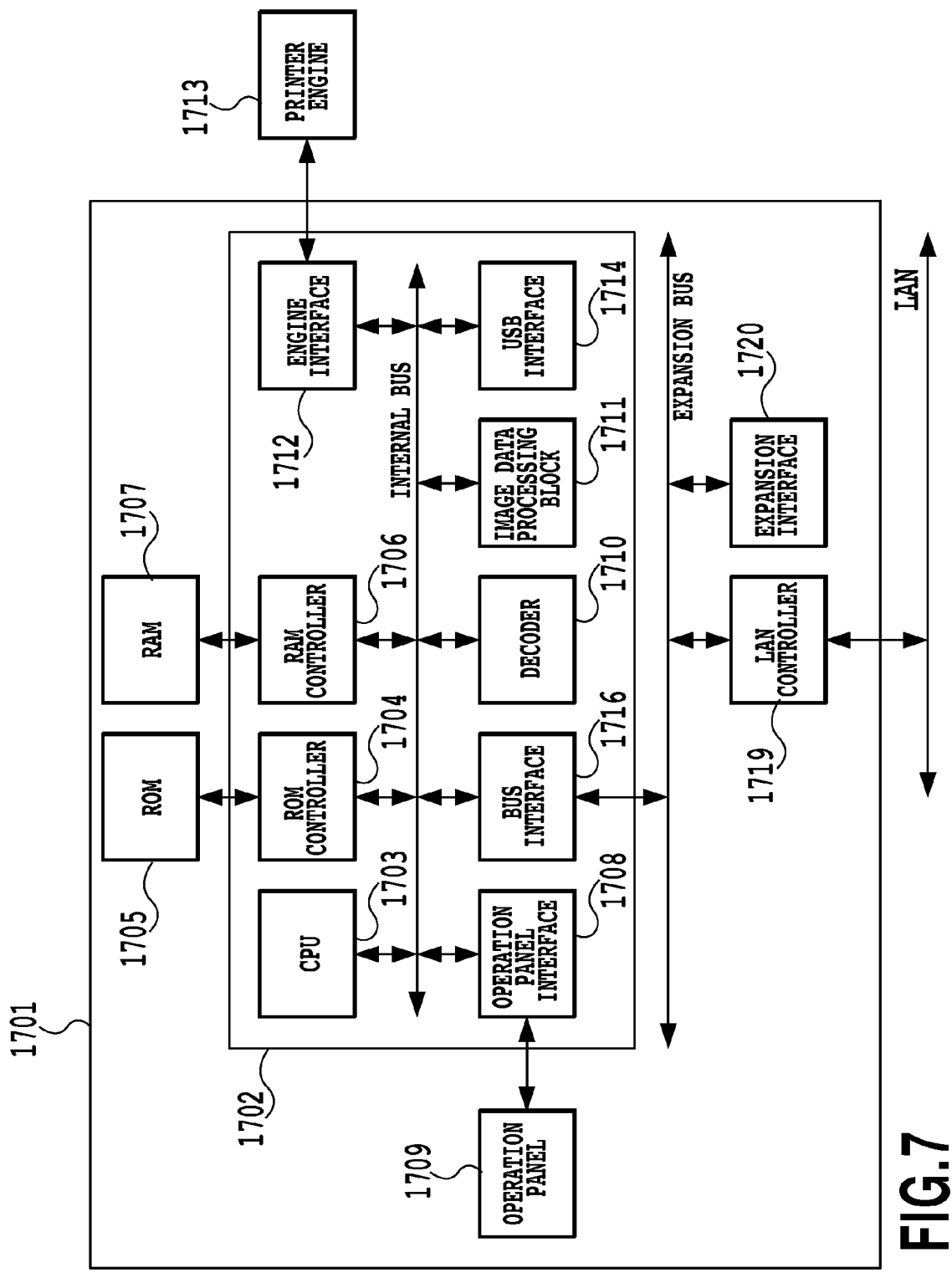
FIG. 7 is a block diagram showing the control construction in the inkjet printing apparatus shown in FIG. 6.

FIG. 7 is a block diagram showing the control configuration of the aforementioned ink jet printing apparatus. As shown in this figure, the ink jet printing apparatus is generally constructed of a controller 1701 and a printer engine 1713. The controller 1701 is connected through a LAN interface to plural host PCs on a network and is connected through a USB interface 1714 to a host PC (not shown) to execute printing. Thus the controller 1701 interprets print data transferred from the host PC, executes the image processing, converts the processed data into binary data, and delivers the binary data to the printer engine 1713. The printer engine 1713 is provided with a print heads, driving circuits for motors and sensors. The printer engine 1713 receives the binarized print data and control signals from the controller 1701, and then performs a scan control and an ink ejection control for the print head, and sheet conveying control and the like, thus performing a print.

The controller 1701 is constructed to include a controller chip 1702, a ROM 1705, a RAM 1707, an operation panel 1709, a LAN controller 1719, and an expansion interface 1720. The controller chip 1702, the LAN controller 1719 and the expansion interface 720 are connected through an expansion bus to each other.

The controller chip 1702 is configured in the form of a so-called SOC (system on a chip). The controller chip 1702 is constructed to include a CPU 1703, a ROM controller 1704, and a RAM controller 1706. Further, the controller 1702 is constructed to include an operation panel interface 1708, a bus interface 1716, a decoder 1710, an image data processing block 1711, a USB interface 1714, and an engine interface 1712. These blocks are connected with each other by internal buses.

The CPU 1703 operates according to programs stored in the ROM 1705 and described later in FIGS. 11 and 14, and performs communications with the host PC and the printer engine through various interfaces and further the control of the respective sections. The ROM controller 1704 performs the interface with the ROM 1705 connected thereto. The RAM controller 1706 performs the interface with the RAM 1707 connected thereto, and controls RAM access timing to perform data input/output to the RAM according to requirements from the CPU 1703 or the other blocks.

The operation panel interface 1708 performs the interface with the operation panel on which operation keys, a LED and a LCD are mounted. The operation panel interface 1708 transmits operation key input from a user to the CPU 1703, and displays of the LED and LCD are controlled by a command from the CPU 1703. The bus interface 1716 is a block for controlling the expansion bus and performs the communication control with each controller connected to the expansion bus. The decoder 1710 reads out print data, which are compressed and coded, and are transmitted from the host PC, from the RAM 1707 and decodes the read print data, which are written back to the RAM 1707.

The image data processing block 1711, a detail of which will be described later in FIG. 8 or the like, reads out data decoded by the decoder from the RAM 1707, and converts the data into print data of each ink color, which will be written back to the RAM 1707.

The engine interface 1712 reads out dot data of each ink color from the RAM 1707 and performs the control of transmitting the read dot data to the printer engine 1713. The print data transmitted from the host PC are input from each interface of the controller. The print data input via the LAN controller are transmitted through the expansion bus via the bus interface 1716 in the controller chip 1702 and then are written into the RAM 1707 according to the control of the RAM controller 1706. The print data written into the RAM 1707, a communication protocol of which is interpreted by the CPU 1703, are delivered to the decoder 1710 to be decoded therein. The decoded image data are converted into print data of each ink color by the image data processing block and thereafter, the converted print data are transmitted through the engine interface 1712 to the printer engine 1713 to be printed.

Figure 8:
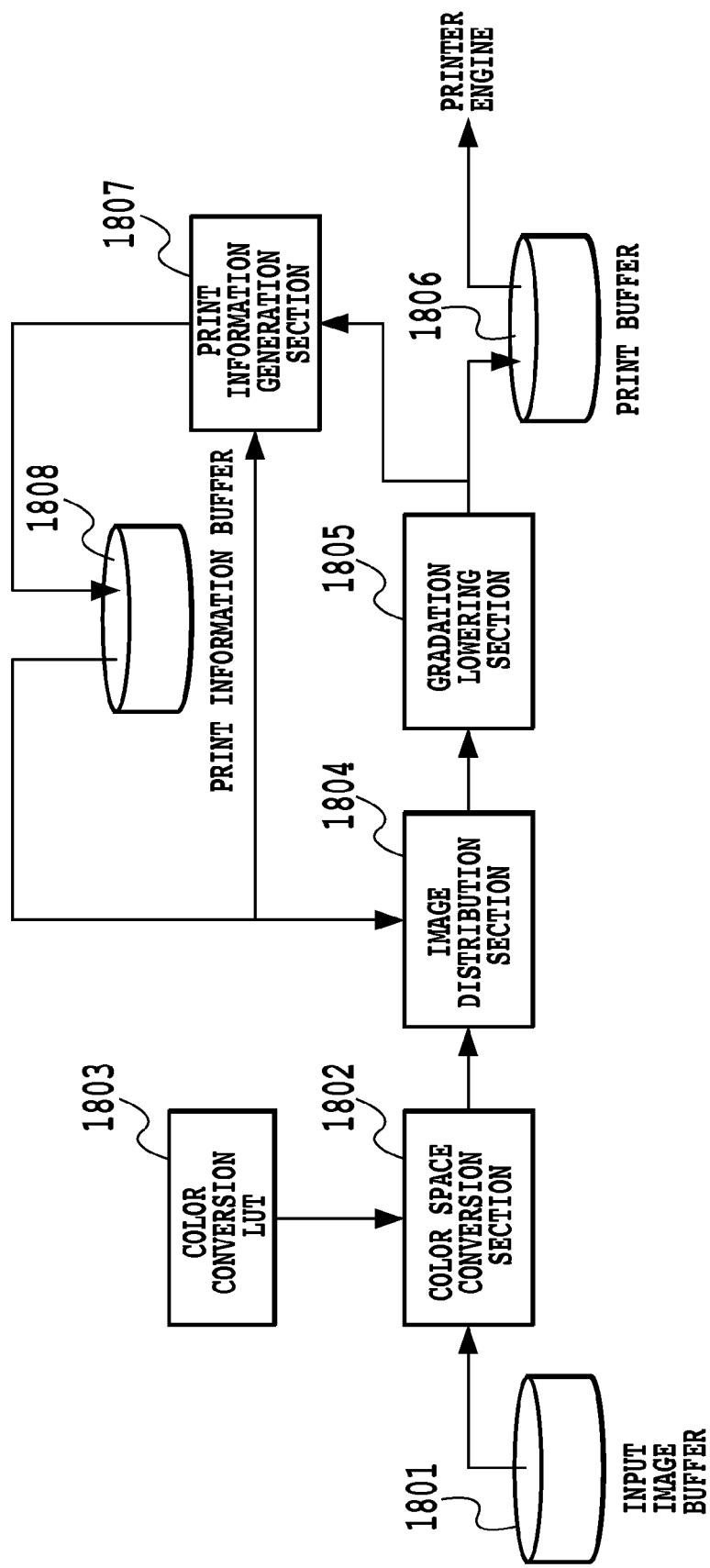
FIG. 8 is a block diagram showing a detailed construction in the image data processing section shown in FIG. 7 and various buffer constructions.

FIG. 8 is a block diagram showing the detailed configuration of the image data processing block 1711 shown in FIG. 7 and the various buffers. These buffers are retained in the RAM 1707 shown in FIG. 7.

The input image data sent from the host PC are stored in an input image buffer 1801 as an image data storage memory. The image data at this time (first multi-valued image data) are multi-valued brightness data (R, G, and B) expressed by 256 gradation levels of eight bits per one pixel, for example. That is, the image data constitute the data of the three dimensional RGB color space. It should be noted that, not limited to this example, in general, it is also apparent from the following explanation that the present invention can be applied to multi-valued image data of an L dimensional color space (L is the integer equal to or greater than 1). A color space conversion section 1802 converts the multi-valued image data in the color space of RGB which is read out from the input image buffer into density data (second multi-valued image data) of ink colors used in the printer engine, for example, the multi values (256 gradations of eight bits) corresponding to the color space of CMYK. At the conversion, a lookup table (LUT) 1803 for color conversion is referred to. The color space of the second multi-valued image data is a color space having the number of dimensions (4) which is equal to or more than the number of dimensions of the above L dimensional color space.

Next, the multi-valued image data for each color input to an image distribution section 1804 are distributed to respective data of two planes. More specifically, when the multi-pass printing which completes printing by two times of scans is performed in the printer engine, the multi-valued image data are distributed or divided to data of the two planes as two image data respectively corresponding to the two times of scans. It should be noted that, in a case of completing printing by N times of scans, the image data are distributed to data of N planes (N is the integer of 2 or more). At this time, the image data reading-out section (not shown) reads out input image data from the input image buffer 1801 as in detail described later in FIG. 12. The reading-out start position can be designated by setting it in a resister section built in the image data reading-out section. In addition, the distribution to the plane is performed at timing when the corresponding scan is performed. More specifically, when the first scan is performed, the corresponding plane is generated by the distribution and then, when the second scan is performed, the corresponding plane is generated by the distribution.

Here, in a case of completing printing on the same area by two passes, the plane corresponding to the first scan is defined as a first plane and the plane corresponding to the second scan is defined as a second plane. In this case, the image distribution section 1804 distributes the multi-valued image data equally to two planes, that is, each having a distribution coefficient of 0.5. It should be noted that this distribution coefficient is not limited to 0.5, but may be different distribution coefficients with each other as described in Japanese Patent Laid-Open No. 2000-103088 or may be different depending on the pixel position as described in Japanese Patent Laid-Open No. 2006-231736.

The image distribution section 1804, as described later, corrects the multi-valued image data based on the print data obtained for planes subjected to processing by then, which exclude the plane corresponding to the first scan among the plural scans for completing printing, in addition to the aforementioned distribution processing.

The gradation lowering processing is executed to the multi-valued image data for each distributed plane by a gradation lowing section 1805.

That is, the gradation lowing section 1805 executes the binarization processing for each plane by using an error diffusion method. The present embodiment executes the processing of converting multi-valued image data having 256 gradation values of eight bits into binary data of a lower gradation value as two gradation values of one bit. It should be noted that it goes without saying that the lower gradation value data obtained by the gradation lowering processing are not limited to the binary data. For example, it may be so-called index data of 16 gradation values of four bits. The index data correspond to an arrangement pattern of the number of dots in accordance with the gradation value and the arrangement of dots to be printed is defined by obtaining the index data. In addition, the method of the gradation lowering processing is not limited to the error diffusion process, but may be the other binarization method such as a dither method. The obtained binary print data are transferred to a print buffer 1806. When the data corresponding to one scan are accumulated, the data are sent to the printer engine 1713. In the printer engine 1713, the print head performs the scan and also ejects ink based upon the binary data stored in the print buffer. In addition, the print data for the first plane obtained by the gradation lowing section 1805 are also transferred to a print information generation section 1807.

FIG. 9A and FIG. 9B are diagrams each showing a filter calculation executed to the binary print data from the gradation lowing section 1805 by the print information generation section 1807, wherein FIG. 9A shows coefficients of the filter calculation and FIG. 9B shows the calculation result. In each of these figures, a pixel shown in a hatched line is an object pixel defined as an object of the processing by the gradation lowing section 1805. The print information generation section 1807 distributes the result of the binarization to the object pixel and the peripheral pixels based upon a coefficient of each pixel shown in FIG. 9A. In detail, when the result of the binarization is "1" (dot print), the result obtained by multiplying 256 by the coefficient of each pixel is defined as a value of each pixel. On other hand, when the binary data is "0" (dot is not printed), the result obtained by multiplying 0 by the coefficient of each pixel is defined as a value of each pixel. That is, the value is not distributed to the object pixel and the peripheral pixels. As clearly seen from the coefficients shown in FIG. 9A and the distribution result shown in FIG. 9B, in the value of each pixel in the present embodiment, the pixel corresponding to the object pixel is the largest and the next largest value is distributed to pixels positioned at the upward and downward sides and at the right and left sides of the object pixel.

Figure 10:
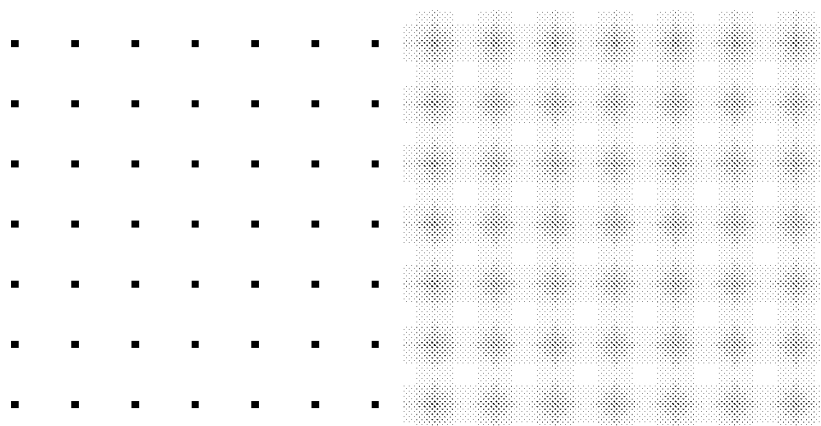
FIG. 10 is diagrams showing the output result (binary data before filtering) of the gradation lowing section shown in FIG. 8 and the result (data after filtering) after executing the filtering processing to the output result.

FIG. 10 is diagrams showing the output result (binary data before filtering) of the gradation lowing section 1805 and the result (data after filtering) after executing the filtering processing to the output result. In an example shown in this figure, a solid image having relatively low density is binarized and as a result the binary data "1" (dot print) exists in each of pixels positioned away by constant intervals vertically and horizontally (binary data before filtering). The each pixel of the binary data is defined as the object pixel, and then the distribution is executed for the peripheral pixels to obtain an arrangement of multi value (256 values) data configured so that the value of the pixel corresponding to the object pixel is the maximum value. The data (FIG. 9B) after the filter calculation obtained thus are added to the past print information before that read out from the print information buffer 1808 to update the print information and the updated print information is stored in the print information buffer 1808. The addition to the past print information before that is made to the pixel in the same position on the print medium. In addition, the control will be explained in FIG. 12. It should be noted that in the processing to the two planes corresponding to two times of scans of each color in the present embodiment, the print information is simply generated based upon the binary data of the first plane.

In the subsequent processing for the second plane, by shifting the reading-out start position from the input image buffer 1801 by a predetermined amount, specially by ½ of the width of the print head, the RGB multi-valued image data are read out. As in the case of the processing for the first plane, the read image data are converted into multi-valued data of the ink colors by the color space conversion section 1802.

Next, the image distribution section 1804 reads out the print information stored in the print information buffer 1808 and converts the read print information into a minus value, which is added to the multi-valued data before the binarizing distributed to the second plane in processing, and sends the added multi-valued data to the gradation lowing section 1805 as the multi-valued image data for the second plane. The gradation lowing section 1805 executes binarization processing in the same way as in the first plane and the obtained binary print data are transferred to the print buffer 1806. It should be noted that the output result of the gradation lowing section 1805 for the second plane is not transferred to the print information generation section 1807.

As described above, the binary data of the pixel defined as "1" (dot print) in the quantization result of the multi-valued data for the first plane is a value which is not 0 in the print information generation section 1807 in regard to the object pixel and the peripheral pixels. In the processing for the second plane, this print information is added as a minus value to the multi-valued data for the second plane. In consequence, a value of the multi-valued data of the pixel in the second plane in which the above addition is made is made small. However, since the density can not be preserved when the print information is simply subtracted, the density is preserved by adding the multi-valued data in the first plane as described in FIG. 13. Thus, In regard to the pixel of the second plane the value of which is made small by the addition, probability of being a binary data of "1" (dot print) by the gradation lowering processing or the quantization at the gradation lowing section 1805 is lower in accordance with the value made small. That is, in an arrangement of the dots printed according to each of the binary data of the first plane and the second plane, it is possible to control a ratio in which the dots by the first plane and the dots by the second plane are formed to overlap, according to the aforementioned filter calculation. As a result, the ratio of the dots formed by the above overlap can be restricted to be smaller as compared to the method described in Japanese Patent Laid-Open No. 2000-103088.

In this way, complementarity or exclusiveness between the planes can be controlled for each pixel by the coefficients in the filter calculation explained in FIG. 9 and in FIG. 10. In addition, a size (filter size) of the area where the coefficients in the filter are arranged may also impose an impact on the complementarity between the planes. Further, the coefficients of the filter may be appropriately defined, for example, according to the content of the image to be printed, including an example that all the coefficients of the peripheral pixels other than the object pixel are made 0.

As described above, the ratio of the pixels in which the dots formed by plural times of scans are printed to overlap can be restricted to be small. As a result, the density fluctuation due to the print position shift between the planes can be appropriately restricted without providing the number of the pixels more than necessary in which the dots are overlapped and printed.

It should be noted that there is explained an example of the multi-pass printing that completes printing with the two-pass, but it goes without saying that the present invention can be applied to a case of using a multi-pass (M-pass) printing operating the number of more times of scans for completing a print (M-pass; M is the integer larger than 2). In this case, the image distribution section 1804 distributes the input multi-valued image data to M pieces of planes from the first plane to the M-th plane. The print information generation section 1807 sequentially integrates the results by executing the filtering processing from the first plane to the (M−1)-th plane in predetermined pixel positions in the print information buffer 108. For example, in a case of executing the gradation lowering processing (binarization) of the data in the M plane, in the pixel printed ("1") in any of the first to (M−1)-th planes, the dot is difficult to be printed by the M-th scan. That is, in all of the first plane (first scan) to the M-th plane (M-th scan), M kinds of binary data respectively corresponding to the M times of print scans can be generated so that the dots are printed in such a manner as to be dispersed exclusively with each other.

In addition, in the above explanation, the filter used at the print information generation section 1807 is, as shown in FIG. 9A, an isotropic weighted average filter having the area of three pixels×three pixels and in which the coefficients are arranged concentrically, but is not limited thereto. The filter may be formed of a wider square having an area of five pixels×five pixels or seven pixels×seven pixels, but an aerotropic filter having an area of five pixels×seven pixels or five pixels×nine pixels and in which filter coefficients are arranged elliptically may be used. The filter having band pass characteristics or bypass characteristics may be used instead of the form of the filter having the robust properties.

Next, the color space conversion processing, the image distribution processing, the gradation lowering processing and the print information generation processing in the present embodiment for the image data obtained by reading out the multi-valued image data from the image buffer explained above will be explained particularly from a point of the reading-out from the memory (buffer) of the image data. It should be noted that the above explanation relates to the multi-pass printing of the two passes, but the following explanation relates to an example of a multi-pass printing of a four passes. As seen from the following explanation, an essential difference in an application of the present invention is only a point that the two-pass printing reads out the same data from the memory twice and on the other hand, the four-pass print reads out the same data four times.

Figure 11:
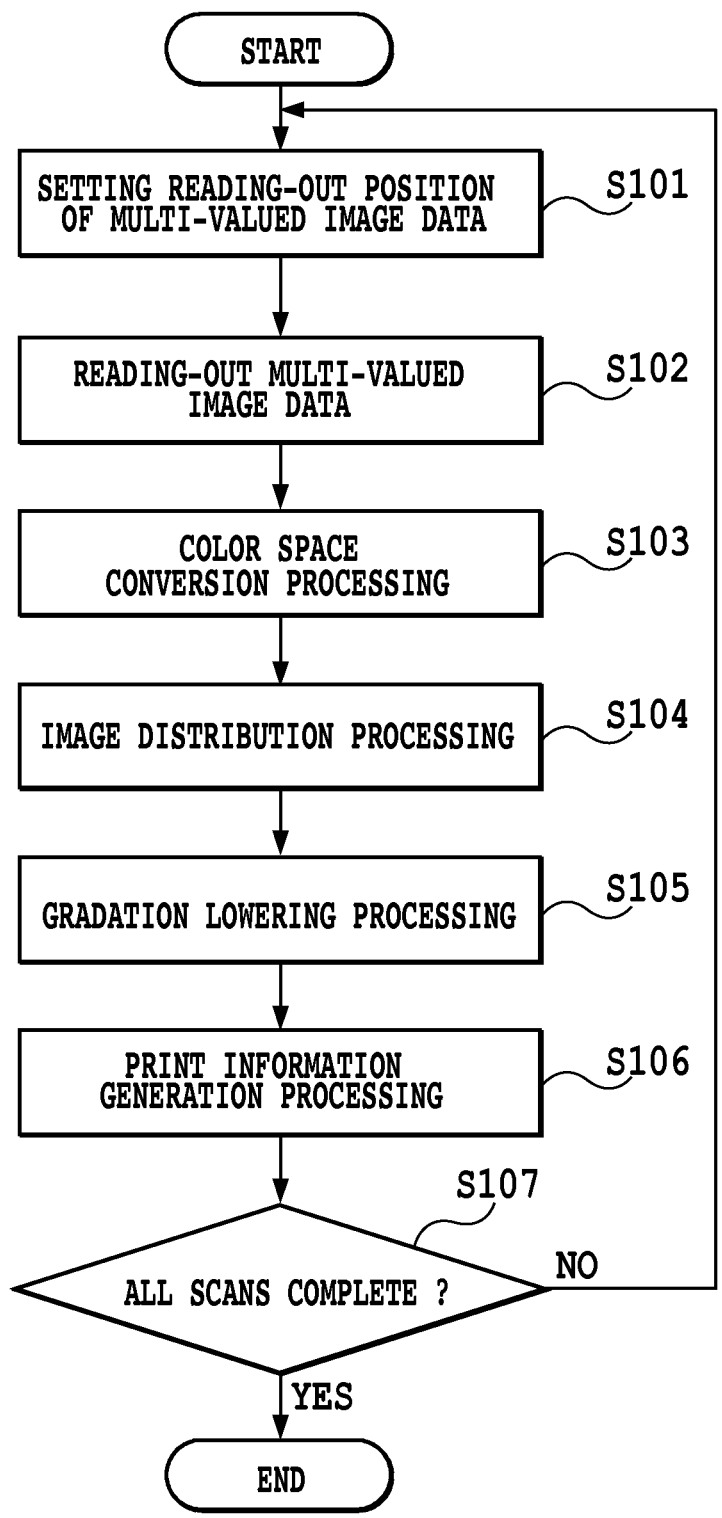
FIG. 11 is a flowchart showing a series of processing according to the first embodiment of the present invention explained with reference to FIGS. 8 to 10.

FIG. 11 is a flow chart showing a series of processing according to the present embodiment which has been explained with reference to FIGS. 8 to 10. The processing is executed by the CPU 1702 explained with reference to FIG. 7.

At step S101, the reading-out start position at the time of reading out the multi-valued image data from the input image buffer 1801 is set. Next, at step S102, it is perform to read out the multi-valued image data from the input image buffer 1801. The reading-out amount is, as explained next, an amount of the data corresponding to the number of the ejection openings used for the printing by one time of scan in regard to ejection openings provided in the print head, and the amount of the data is read out for each color of inks.

FIG. 12 is a diagram showing a relation between the multi-valued image data read out from the input image buffer 1801 and the reading-out positions, and multi-valued ink color data (pass data) and the print information, which are generated by a series of processing after the reading-out in the processes shown in FIG. 11. The input image buffer 1801 includes areas R1 to RN which are allocated. These areas are defined by previously determined number of pixels in each of raster and column directions. The horizontal direction of each of the areas in the input image buffer 1801 corresponds to the scan direction of the print head and the vertical direction of each of the areas in the input image buffer 1801 corresponds to the array direction of print elements (ejection openings) of the print head. In other words, the areas R1 to RN in the input image buffer 1801 are made by dividing a storage area into a plurality of pieces arranged in the column direction. Then, reference numerals 1102-1105 denote data used in respective scans.

As shown in FIG. 12, the multi-valued image data 1102 corresponding to HD are read out from the input image buffer 1801. More specifically, an access is made to the areas R1-R4 in the input image buffer 1801 to read the multi-valued image data 1102. Here, the HD corresponds to the number of print elements (number of ejection openings) provided in the print head. Accordingly, printing of the scan area having the width HD is performed by one time of the scan. For example, in a case of the print head provided with 128 print elements, the HD corresponds to the width of 128 dots printed with ink on a print medium. In the four-pass printing, printing of the scan area having a ¼ HD width (print width of 32 dots) as ¼ of the above width is completed by four times of scans. Therefore, the data are specified or distinguished in this unit (¼ HD) and the reading-out position is shifted in this unit for each scan, in the subsequent processes. The RAM controller 1706 executes the above described read-out control in accordance with instruction from the CPU 1703 to read out the multi-valued image data 1102 from the input image buffer 1801 provided in the RAM 1707.

At step S103, a color space conversion processing 1106 is executed to the read-out image data. In the present embodiment, the image data of R, G, and B having eight bits per pixel are respectively converted into the ink color image data of CMYK having eight bits per pixel.

Next, at step S104, an image distribution processing 1110 is executed to obtain multi-valued image data 1114 of each ink color. The multi-valued image data 1114 of the ink color after the distribution has four data units each having a ¼ HD width. The data of each unit is, as shown in FIG. 12, distinguished by an identifier "0.1", "0.2", "0.3", or "0.4". The data of the identifier "0.1" are, in a case of completing printing of an area by four passes, data of the area printed by the first pass (first scan). Likewise, the data of the identifier "0.2" are data printed by the second pass (second scan), the data of the identifier "0.3" are data printed by the third pass (third scan), and the data of the identifier "0.4" are data printed by the fourth pass (fourth scan). It should be noted that in order to relate print elements constituting the print element array to the data, the print elements are divided into four groups (blocks) arrayed in the array direction of print elements. For example, in a case of the print element array including 128 print elements, the data of the identifier "0.1" corresponds to 1st to 32nd print elements (Block 1). Likewise, the data of the identifier "0.2" corresponds to 33rd to 64th print elements (Block 2), the data of the identifier "0.3" corresponds to 65th to 96th print elements (Block 3), and the data of the identifier "0.4" corresponds to 97th to 128th print elements (Block 4).

Figure 12B:
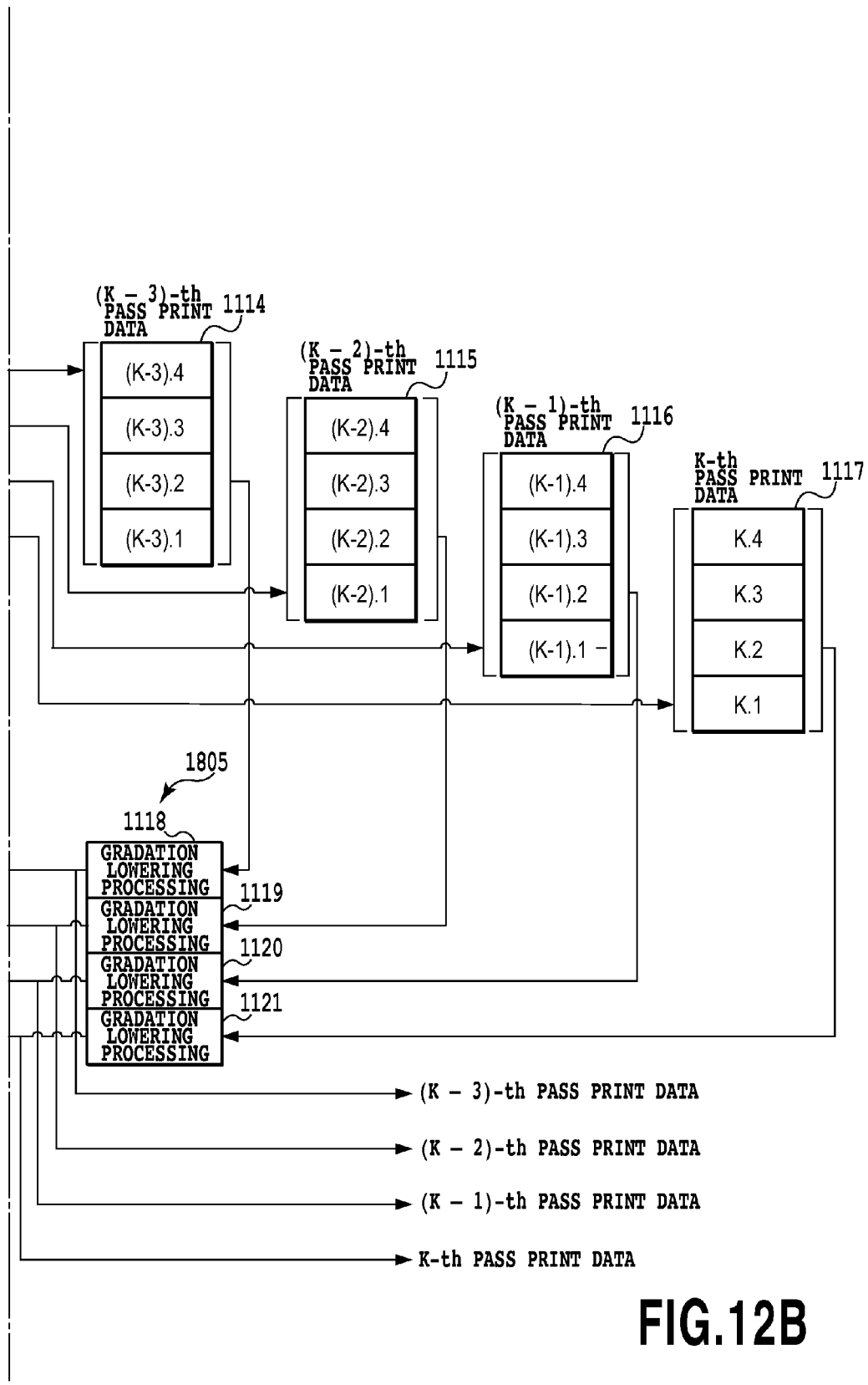
FIG. 12 is a diagram showing a relationship between FIGS. 12A and 12B, and FIGS. 12A and 12B are diagrams showing a relation between multi-valued image data read out from the image buffer and the reading-out positions, and multi-valued ink color data (pass data) generated by a series of processing thereafter or the print information in the processing shown in FIG. 11.

FIGS. 12A and 12B show an example where the reading-out and the distribution explained above are performed so that the data (1114) of the (K−3)-th scan, the data (1115) of the (K−2)-th scan, the data (1116) of the (K−1)-th scan, and the data (1117) of the K-th scan are generated. Here, the respective data 1115-1117 are shown correspondingly to the areas of the input image buffer in which the respective data were stored. As an example, the data 1114 of "(K−3). 1", the data 1115 of "(K−2). 2", the data 1116 of "(K−1). 3", and the data 1117 of "K. 4" are shown as data stored in the area R4. In this way, the distribution by the image distribution section 1804 explained in regard to a case of the aforementioned two-pass and the later correction of the image data based on the print information are performed for four image data (plane: divided image) of different passes without mentioning.

Next, at step S105, the gradation lowering processing is executed to the multi-valued image data of the ink color to which the image distribution processing has been executed, thus obtaining binary print data. In the present embodiment, the error diffusion method is used for the gradation lowering processing. In FIG. 12, for example, the distributed multi-valued image data 1114 are binarized by the gradation lowering processing 1118, which are sent as the print data of the (K−3)-th scan through the print buffer 1806 to the printer engine at a predetermined timing. With this, the binary print data obtained by the gradation lowering processing 1118 are outputted to print information generation section 1807.

Next, at step S106, the print information generation section 1807 executes print information generation processing 1122 for the binarized print data. Next, at step S107, it is judged whether all of scans are completed. When all of scans are not completed, the processing returns to step S101. It should be noted that a detail of the print information generation is as explained for the print information generation section 1807 in FIG. 8 described before. In a case of the four-pass printing, for the print data of the identifiers "0.1", "0.2", and "0.3", that is, only for the print data of the first pass to the third pass among four times of the passes for completing printing, the print information generation processing is executed. This is because, as seen clearly from the explanation of the example of the aforementioned two-pass printing, it is not required to generate the print information for correction since there exist no data to be printed after the print data of the fourth pass as the final scan.

The generated print information for each pass is stored in a predetermined area in a print information buffer 1126. More specifically, the print information is updated by adding the print information to be stored to the print information obtaining by adding the pieces of the print information in the scans performed until the scan corresponding to the print information to be stored. For example, the print information from the print data based on the data units of "(K–3). 1", "(K–2). 2", and "(K–1). 3" each having the ¼ HD width shown in FIG. 12 is sequentially added. That is, for example, each piece of the print information based on the print data of the first pass to the third pass for completing the printing on the same area corresponding to the area R4 is sequentially added, which is reflected in the multi-valued image data of the next pass at the image distribution processing at step S104. At a point where the gradation lowering processing and the print information generation processing in the K-th pass data are completed, the print information corresponding to "K. 1" is stored in "0.1" in the print information buffer 1126. In addition, the print information corresponding to "K. 2" and "(K–1). 1" is added, which is stored in "0.2", and the print information corresponding to "K. 3", "(K–1). 2", and "(K–2).1" is added, which is stored in "0.3". the RAN controller 1706 also executes a writing control (storing control) to the print buffer 1806 and the print information buffer 1808 based on the instruction from the CPU 1703.

Figure 13:
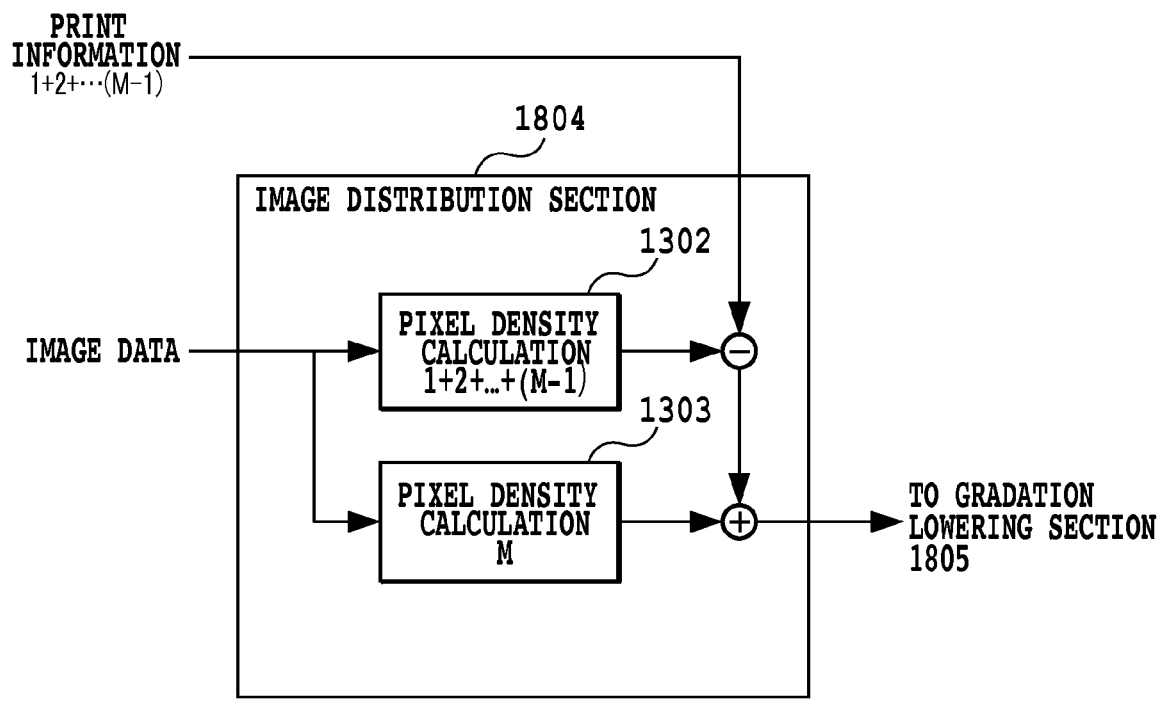
FIG. 13 is a diagram showing the processing of reflecting the print information to the multi-valued image data of the next pass, specially a detail of the processing of correcting the multi-valued image data with the print information by the image distribution section (FIG. 8)

FIG. 13 is a diagram showing the processing of reflecting the print information to the multi-valued image data in the next pass by the image distribution section 1804 (FIG. 8), specially a detail of the processing of correcting the multi-valued image data with the print information.

The image distribution section 1804 is configured to include two pixel density calculation sections 1302 and 1303. The image distribution section 1804 receives the multi-valued image data subjected to the color space conversion section 1802. The pixel density calculation section 1302 calculates the sum of density data values derived for printing by scans which have been performed, for each pixel. The figure shows the calculation content at the time of distributing the print information of the M-th pass. For example, in a case of M being 4, the pixel density calculation section 1302 derives density data using coefficients corresponding to the data units to be generated ("0.1", "0.2", "0.3"). For example, the coefficient for the data unit "0.1" is 0.27, the coefficient for the data unit "0.2" is 0.26, and the coefficient for the data unit "0.3" is 0.24. Then, the sum of three derived density data is obtained. For example, in order to generate the data unit "K. 4" in the data 1117, the pixel density calculation section 1302 calculates the sum of three density data values of the data unit "(K–3). 1", "(K–2). 2", and "(K–1). 3". It should be noted that the above described coefficients may be the same values to each other, but the sum of coefficients for the data unit "0.1" to "0.4" is 1.

On the other hand, for example, the pixel density calculation section 1303 calculates the density value allocated to M-th pass using the coefficient 0.23 and outputs calculated result. From the total of the density values by the pixel density calculation section 1302, the print information generated for the first pass to the (M–1)-th pass stored in the print information buffer is subtracted, and the result is added to the calculated result by the pixel density calculation section 1303. In this way, in the present embodiment, when correcting the multi-valued image data of the M-th pass, the accumulated print information is not subtracted directly from the density value of the multi-valued image data of the M-th pass, but a difference between the accumulated print information and the density value until the (M–1)-th pass is subtracted from the density value of the multi-valued image data of the M-th pass. In other words, when correcting the multi-valued image data of the M-th pass, the accumulated print information is subtracted from the density value of the multi-valued image data and thereby dot printing is hard to be generated at the same pixel position when performing the gradation lowering processing. With this, a calculation for preserving the density is made by a sum of the density values distributed to the first to the (M–1)-th pass respectively, which are outputted from the pixel density calculation section 1302.

In a case of the multi-pass print of the four passes, M=1, 2, 3 and 4. In FIGS. 12A and 12B, the image data unit of the identifier "0.1" is data corresponding to an area to be printed first on a print medium and therefore the print information is not used. The image data unit of the identifier "0.2" is data corresponding to an area to which one time of printing has been already performed. In this case, the image data of the identifier "0.1" which is previous data by one pass and the image data of the identifier "0.2", and the multi-valued image data calculated with use of the print information corresponding to the identifier "0.1" correspond. The density value for each pixel of the image data unit of the pixel having the identifiers "0.3" and "0.4" is likewise generated.

An explanation referring to FIG. 11 is again made. When it is determined at step S107 that all the scans (passes) are completed, the present process ends. When the fourth pass is completed at the multi-pass printing of the four passes, the process ends. At less than the fourth pass, in a case where the subsequent pass print is required, the process goes back to step S101, the reading-out position of the multi-valued image is changed by an amount corresponding to one area, and then the subsequent processing is repeated.

In FIGS. 12A and 12B, in the processing for the (K–2)-th pass, an access is made to the areas R2-R5 in the input image buffer 1801 and the multi-valued image data 1103 are read out. The color space conversion section 1802 performs color space conversion processing 1107 to the multi-valued image data 1103. Image distribution processing 1111 reads out the print information updated at the previous pass processing, that is, at the (K–3)-th pass processing from the print information buffer 1126 to refer to the read-out print information, and executes the image distribution processing. The image distributed data 1115 are binarized by gradation lowering processing 1119, which are sent to the print buffer as the (K–2)-th print data. At the same time, the (K–2)-th print data is outputted to the print information generation section 1807 and print information generation processing 1123 is executed based on the (K–2)-th print data. The print information generated by the print information generation section 1807 is stored in the print information buffer 1126. The above processing is repeated to generate print data of the subsequent passes, thus printing an image on the print medium. A supplemental explanation for reading-out from the input image buffer 1801 is as follows. In (K–1)-th pass processing, the access is made to the areas R3-R6 in the input image buffer 1801 and then the multi-valued image data 1104 is read out. Further, in K-th pass processing, the access is made to the areas R4-R7 in the input image buffer 1801 and then the multi-valued image data 1105 is read out.

Incidentally in the embodiment explained above, the multi-valued image data stored in the input image buffer 1801 are read out for each scan. In addition, the color space conversion and the image distribution are performed to the multi-valued image data and the binarized result is sent to the print buffer and at the same time, is accumulated as the print information to execute the reflection process to the image distribution processing of the next pass.

In this case, since the multi-valued data converted into the data of ink color are used at image distributing according to the processing in the present embodiment, if the multi-valued data of the ink color are stored in the image buffer and are used for executing the subsequent image distribution processing, it is not required to perform the color space conversion for each scan. However, this processing method causes a problem that a capacity of the image buffer increases as compared to the present embodiment. As described above, there is a trend that the number of ink colors used in the printing apparatus increases more and more and there are some printing apparatuses of using ink of 12 colors. When the number of ink colors increases, a capacity of the buffer for accumulating the multi-valued data of the ink colors increases in proportion to the number of ink colors, and according to it, the cost of the memory for the image buffer increases. On the contrary, as in the case of the present embodiment, the multi-valued image data at the stage of RGB are accumulated in the input image buffer and the data stored in the image buffer are read out to execute the processing. As a result, even if the number of ink colors provided in the printing apparatus increases, a capacity required for the image buffer does not change. The processing having the input image data of RGB as a starting point thus shown in the present embodiment is effective for restricting an increase in the image buffer capacity to construct the printer at a low cost.

According to the present embodiment, the ratio of the pixels in which the dots formed by plural times of scans are overlapped and printed can be restricted to be small. As a result, it is possible to appropriately restrict the density fluctuation due to the print position shift between planes without providing the pixels where the dots are overlapped and printed more than necessary.

Further, in the processing of reflecting the result of the gradation lowering processing of the above other plane, the gradation lowering processing of the first plane is executed by a method where the dots are arranged to disperse appropriately, thereby making it possible to appropriately disperse also the dot arrangements of the plane where the result of the gradation lowering processing is reflected. Appropriate dispersion of the dot arrangements means that a low frequency component in the space frequency measured in regard to the dot arrangement is low and can be realized by any of conventionally known methods. In general, when the print position is shifted between planes, a texture due to the dot arrangement in the individual plane is detected and this texture is possibly recognized as a harmful effect of an image. However, when the arrangements of the dots in each plane are appropriately dispersed as described above, even if the shift between the planes is generated, it is difficult for the texture to be recognized as the harmful effect of the image. That is, in the image of imposing importance on evenness, not only the density fluctuation is restricted, but also the robustness to the texture is reinforced, and therefore, a more preferable output image can be obtained.

Second Embodiment

Figure 1:
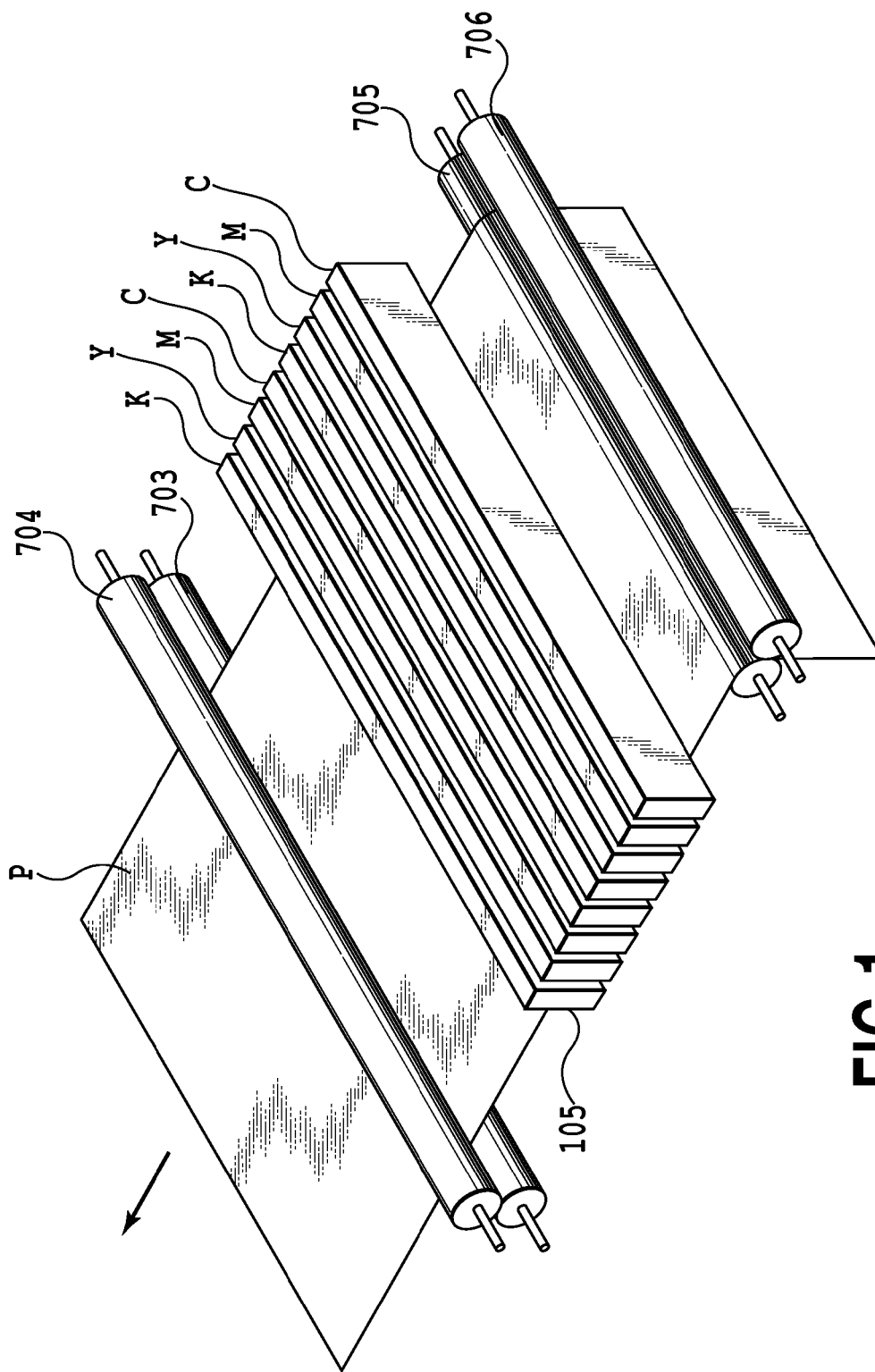
FIG. 1 is a perspective view showing the schematic construction of a full line type inkjet printing apparatus.
Figure 2:
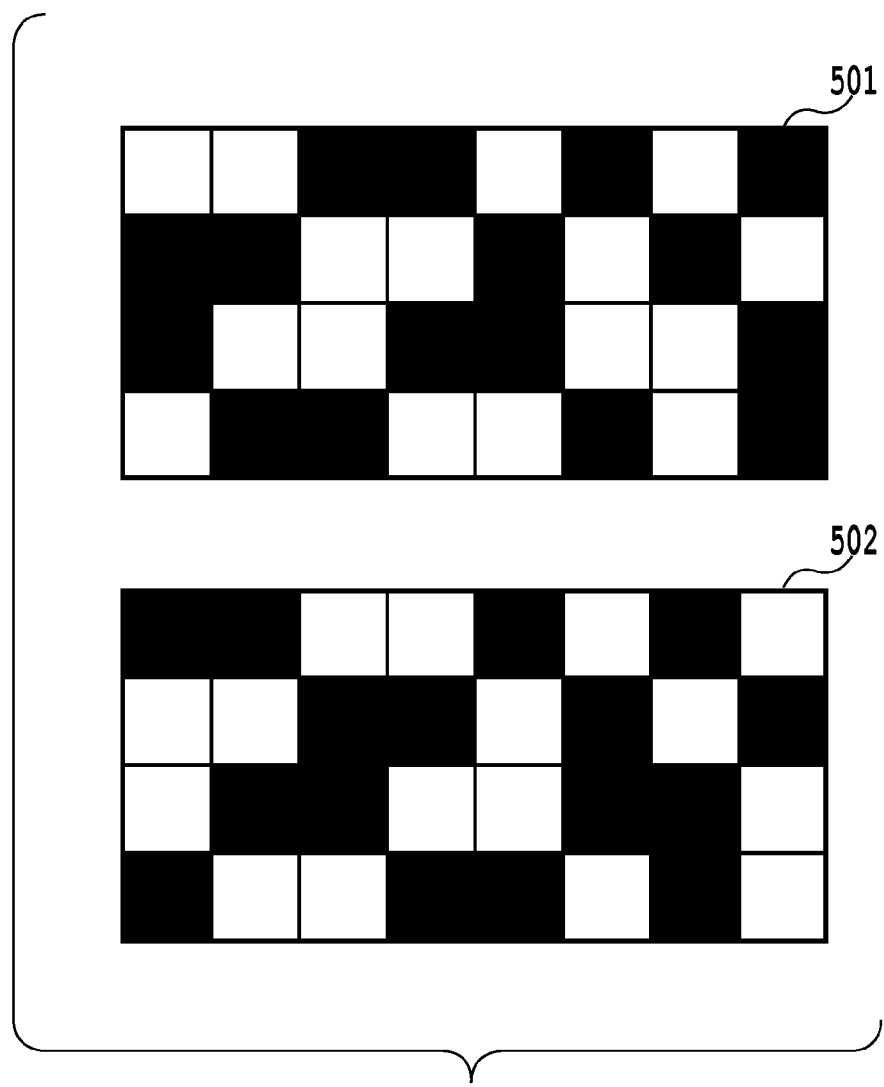
FIG. 2 is a diagram showing an example of a mask pattern used in a multi-pass print for completing a print by twice scans in a serial system.
Figure 3:
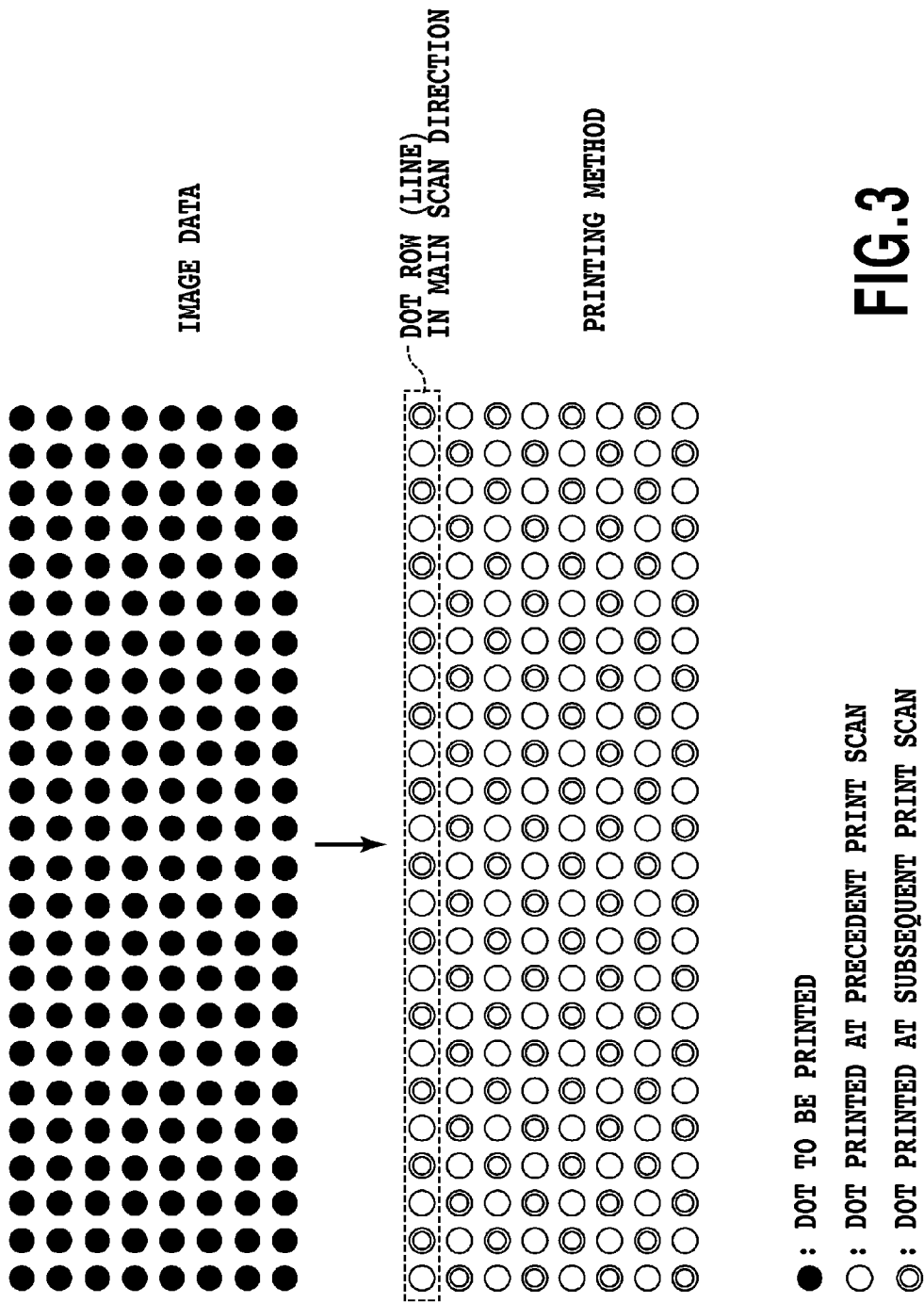
FIG. 3 is diagrams showing an arrangement of print pixels in binary image data and the result obtained by distributing the print pixels to two scans according to the method described in Japanese Patent Laid-Open No. H06-191041 (1994)
Figure 4:
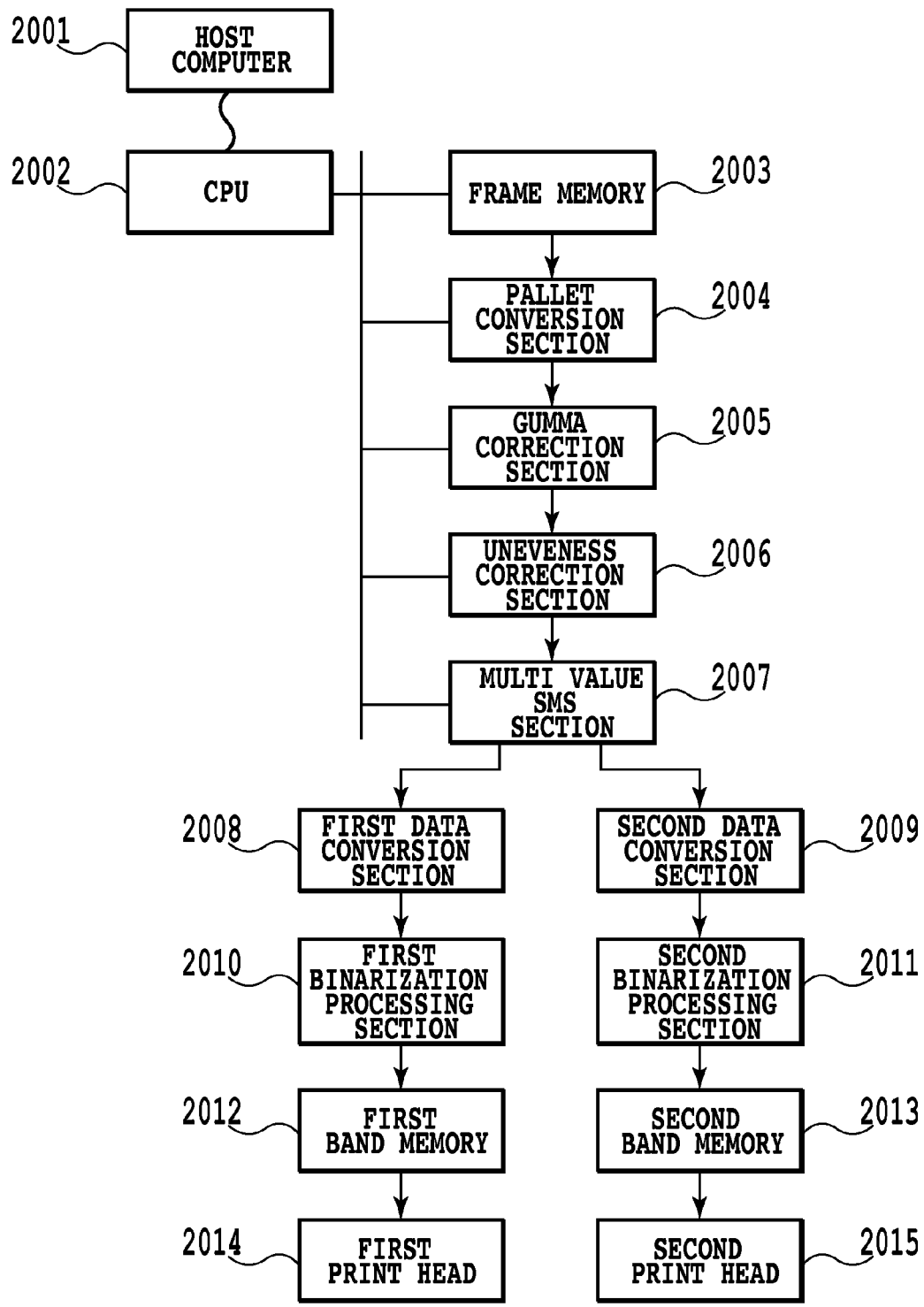
FIG. 4 is a block diagram showing a control construction example for realizing data distribution described in Japanese Patent Laid-Open No. 2000-103088.
Figure 5:
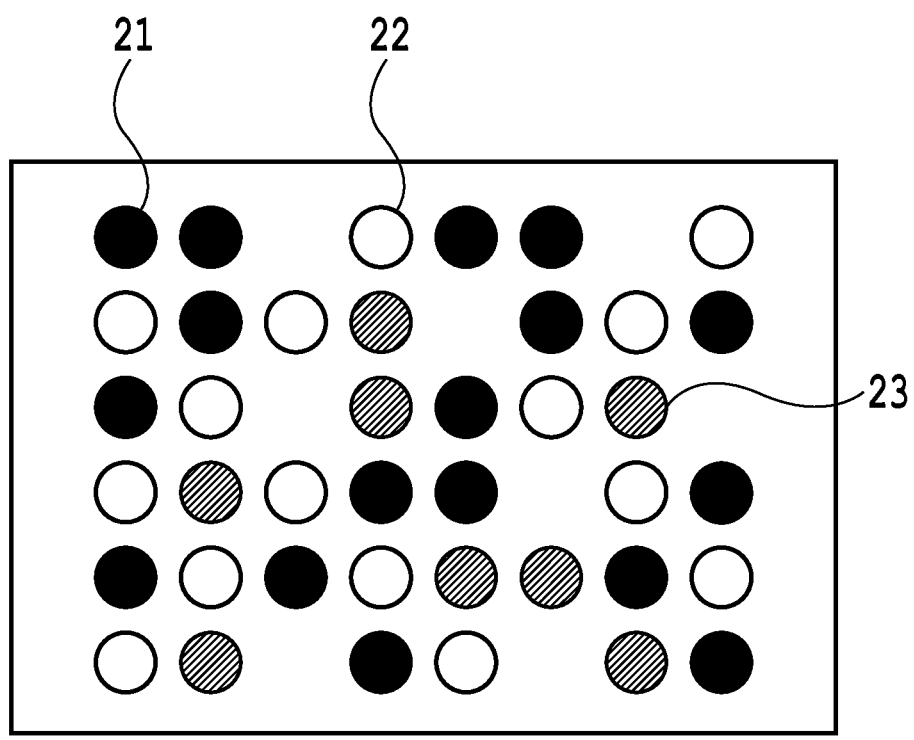
FIG. 5 is a diagram showing an arrangement of dots printed on a print medium according to the processing described in Japanese Patent Laid-Open No. 2000-103088.

The aforementioned embodiment explains an example of the serial type inkjet printing apparatus, but the present invention can be also effectively applied to a full line type inkjet printing apparatus shown in FIG. 1.

FIG. 1 shows the schematic construction of the full line type inkjet printing apparatus according to the present embodiment.

In FIG. 1, after the print medium P is fed by the feeding roller 705 and the auxiliary roller 706, the print medium P is conveyed toward the direction of the feeding roller 704 and the auxiliary roller 703 and is conveyed in a sub scan direction shown in an arrow at a predetermined speed while being held by the two pairs of the rollers. Ink is ejected onto the print medium to be thus conveyed from individual ejection openings arranged in a main scan direction of the print head 105 at a constant frequency corresponding to the conveying speed of the print medium. The print head 105 is constructed so that the full line type print heads for ejecting ink of cyan (C), magenta (M), yellow (Y) and black (K) are arranged by certain intervals in the sub scan direction to form two lines of the print heads for each color. That is, the image data of each of K, C, M and Y are distributed to two planes (data of the divided images) corresponding to the two print heads of each color, and in a line of each pixel connected in the sub scan direction, dots are formed by ink ejected from the two ejection openings for each color. In the present embodiment, the plane is called a first plane or a second plane for each color group (CMYK).

Figure 14:
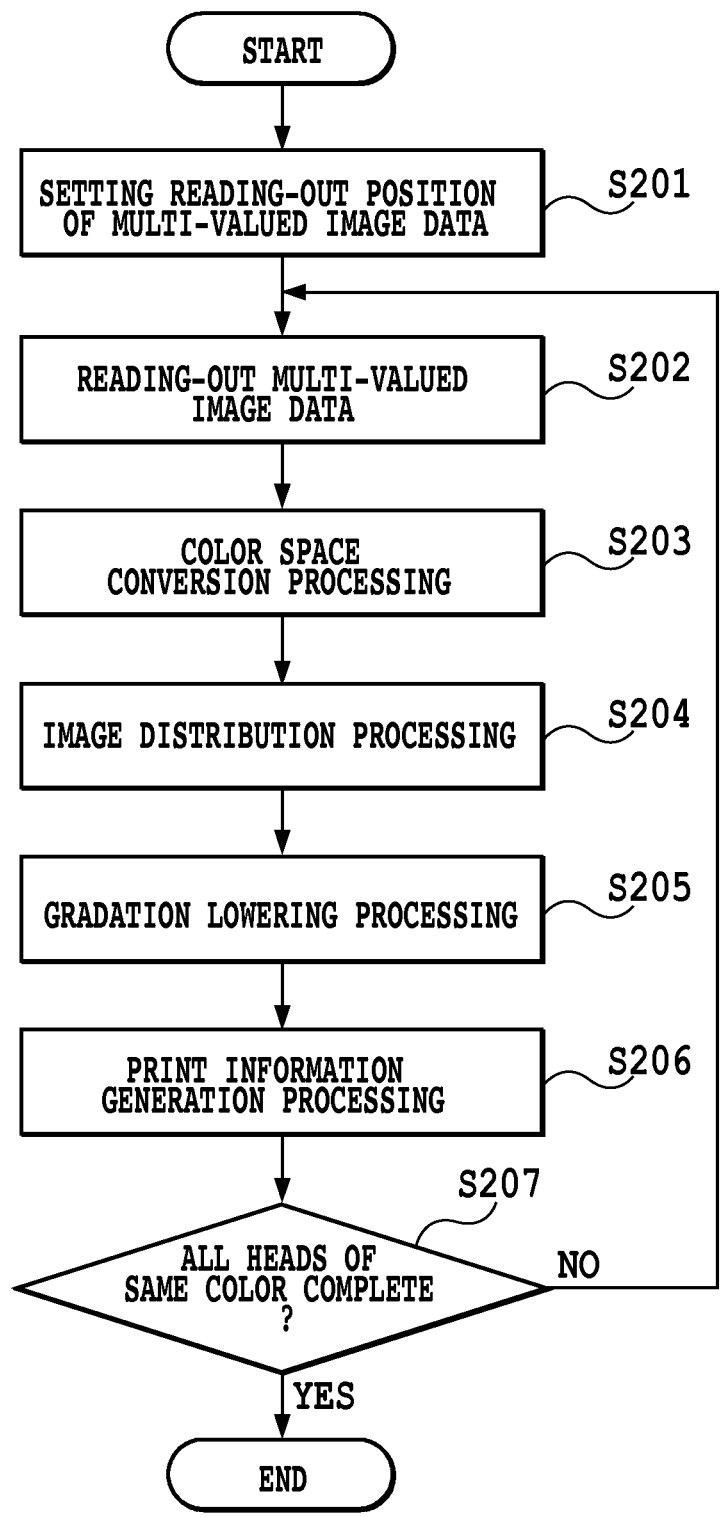
FIG. 14 is a flow chart showing image processing according to a second embodiment of the present invention.

FIG. 14 is a flowchart showing the image processing of the present embodiment. The processing shown in this figure is substantially the same as the processing in the first embodiment explained in FIG. 11, but differs in a point of the process order of setting reading-out positions for the multi-valued image data at step S201 and the repetition processing end determination condition at step S207.

In the first embodiment, the reading-out position is shifted for each scan (pass) of the print head, but in the present embodiment, the same multi-valued image data are used for generating the print data for two print heads to the same ink color. Accordingly, the processing in FIG. 14 is executed to the first plane and the second plane relating to the two print heads for the same ink color, that is, the print heads of each of K, Y, M, and C shown in FIG. 1. When the processing of the same ink color is completed, the similar image processing is executed in regard to a different ink color.

Figure 15:
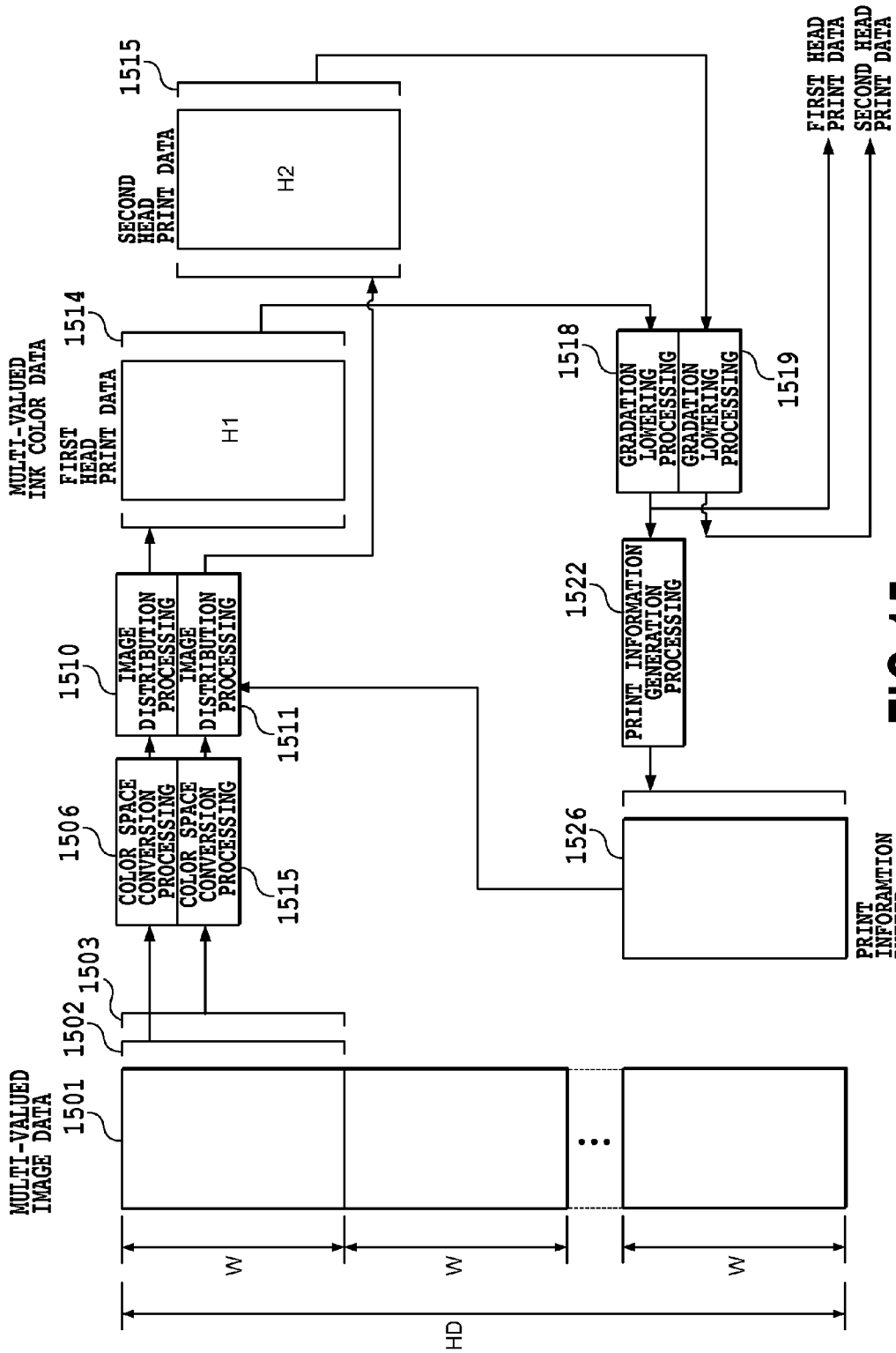
FIG. 15 is a diagram showing a relation between multi-valued image data read out from the image buffer and the reading-out positions, and multi-valued ink color data generated by a series of processing thereafter or the print information in the processing shown in FIG. 14.

FIG. 15 is a diagram showing a relation between multi-valued image data read out from the image buffer and the reading-out positions, and multi-valued ink color data and the print information generated in a series of the subsequent processing, in the processing shown in FIG. 14.

A multi-valued image data buffer 1501 to be prepared has a capacity of a width HD corresponding to the number of ejection openings in the print head of each color and a capacity corresponding to a print length thereof in the horizontal direction in the figure. The print length is a length of the image data on the print medium in the conveying direction. For example, the print head width HD is divided into plural areas and a width of one area thereof is denoted by W shown in the figure. First, the processing of generating print data for the first print head for the first plane is executed. Here, the first print head is a print head first forming dots on the print medium to be conveyed. Multi-valued image data 1502 in the area shown in W are read out. Color space conversion processing 1506 is executed to the read-out multi-valued image data and image distribution processing 1510 is executed to the result of color space conversion processing. Here, the multi-valued image data are distributed to two planes for two print heads. The distributed data for the print head are shown as multi-valued image data 1514. The multi-valued image data 1514 of the ink color are next binarized by gradation lowering processing 1518 to generate the print data for the first print head, which are stored in the print buffer. At the same time, print information generation processing 1522 is executed based upon the print data for the first print head, and the result is stored in a print information buffer 1526. The print information generation processing executes the processing similar to that in the first embodiment.

Next, the processing of generating print data for the second print head as data in the second plane is executed. Multi-valued image data 1503 are read out from the multi-valued image buffer 1501. However, since the reading-out position is the same as at the above processing, the multi-valued image data 1502 and the multi-valued image data 1503 are the same to each other. Next, the color space conversion processing 1506 is executed to the read-out multi-valued image data, and image distribution processing 1511 is executed to the result of the color space conversion processing. The image distribution processing 1511, which different from the above image distribution processing 1510, reads out the print information from the print information buffer 1526 and executes the image distribution processing based on the read-out print information. More specifically, the print information is converted into a minus value, which is added to the multi-valued data before the binarization which is distributed to the corresponding plane to generate multi-valued ink color data 1515 for the second plane. Next, gradation lowering processing 1519 is executed in the same way as the first plane and the obtained binary data are sent to the print buffer. The output result at the gradation lowering processing 1519 for the second plane is not subjected to the print information generation processing.

When the above processing is repeated by the number of the heads for the other ink color and the processing of all the ink color numbers is completed, the reading-out position of the multi-valued image data is shifted downward by a width corresponding to W in FIG. 15 and the similar processing is repeated. When the processing corresponding to the HD width is completed, the data for printing result in being prepared in the print buffer, thus starting a print on the print medium.

As described above, the print data supplied to two kinds of the print elements (ejection openings) of each color are dealt as the two planes explained in the first embodiment and the processing shown in the present embodiment is executed, thereby making it possible to obtain the same effect.

It should be noted that the first embodiment explains an example of the serial scan type printing apparatus where one print head is mounted on each ink color of CMYK, but the present invention can be also applied even to an apparatus where plural print heads are provided for each ink color. For example, in a case where a four-pass printing is performed by providing two print heads of the ink color of C, at the image distribution section 1804 an image is distributed to planes of "two×four=eight". Each of the two print heads prints an image on a print medium by the print scans of four passes and the image of C ink is completed totally by eight times of the print scans. Upon distributing the image at each print scan, the total print information based on printing on the print medium by the two print heads of the C ink color may be referred to. If generalized, the present invention can be applied to the configuration where S (S is the integer of 1 or more) pieces of print heads are used and the second multi-valued image data are distributed to planes of S×N at the image data distribution. In this case, printing is performed by S×N times of print scans with the print head based upon the print data of each of the planes of S×N.

In addition, the embodiment as described above explains an example where the filtering processing at print information generating is executed at the print information generation section 1807, but the present invention is not limited to this construction. At the image distribution section 1804, the filtering processing may be executed to the print information read out from the print information buffer 1808, which thereafter, will be used at image distributing. Accordingly, the print information stored in the print information buffer 1808 may be constructed to have the effect similar to that of the present embodiment in any of data before and after filtering.

In addition, in the embodiments explained above, the printing apparatus with the inkjet system is used, but the present invention is not limited to such a device. Any printing apparatus with a dot alignment system having plural print elements for printing dots on the print medium and expressing an image by the arrangements of the dots can suitably adopt the present invention.

In addition, in the above embodiments, the image processing device executing the featuring image processing of the present invention is explained by taking the printing apparatus having the image processing function as an example, but the present invention is not limited to such a construction. The present invention may be constructed so that the image processing is executed by the host device and the binarized print data are input to the printing apparatus. In addition, the present invention may be constructed so that an image photographed by a digital camera or the like or a graphic image is directly input to a printing apparatus without through a host device and all of the image processing including the processing explained in the above embodiments are executed by the printing apparatus. In the former case, the host device serves as the image processing device in the present invention and in the latter case, the printing apparatus serves as the image processing device in the present invention.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001634, filed Jan. 7, 2009, which is hereby incorporated by reference herein in its entirety.

What is claimed is:

1. An image processing apparatus for recording a color image on a print medium, comprising:
   a buffer configured to store first image data expressed by multi-value data corresponding to a first color space;
   a conversion unit configured to convert the first image data stored in the buffer into second image data that corresponds to a second color space and that corresponds to each recording color;
   a dividing unit configured to divide the second image data converted by the conversion unit into first divided data and second divided data;
   a correcting unit configured to correct the second divided data depending on the first divided data divided by the dividing unit so as to reduce an overlap between a dot based on the first divided data and a dot based on the second divided data; and a control unit configured to read out the first image data for each predetermined recording area where a part of an image of a page is to be recorded and to cause the conversion unit to convert the first image data, the dividing unit to divide the second image data and the correcting unit to correct the second divided data in accordance with the read out first image data.

2. The image processing apparatus as claimed in claim 1, wherein the dividing unit divides the second image data in a column direction.

3. The image processing apparatus as claimed in claim 1, further comprising an output unit configured to output third image data corresponding to the first divided data and fourth image data corresponding to the corrected second divided data to a recording head for recording an image based on the first image data on the print medium.

4. A printing apparatus that is provided with the image processing apparatus as claimed in claim 1 and performs scanning of a print element array constituted of a plurality of print elements to the predetermined recording area of the print medium plural times to perform printing based on the first divided data and the corrected second divided data, wherein the control unit reads out the first image data corresponding to each one time of the scans.

5. A printing apparatus that is provided with the image processing apparatus as claimed in claim 1 and first and second print element arrays, each of which is constituted of a plurality of print elements to perform printing to the print medium moving relative to the first and second print element arrays, based on the first divided data and the corrected second divided data, wherein the control unit reads out the first image data from the buffer in response to respective drive timings of the first and second print element arrays.

6. An image processing method for recording a color image on a print medium, comprising:

reading out first image data corresponding to a first color space which is stored in a buffer and is expressed by multi-value data for each predetermined recording area of a part of an image of a page;

converting the first image data read out from the buffer into second image data corresponding to a second color space and according to each recording color;

dividing the converted second image data into first divided data and second divided data; and correcting the second divided data depending on the first divided data so as to reduce an overlap between a dot based on the first divided data and a dot based on the second divided data.

* * * * *